US012782969B2

(12) United States Patent
Kanamura et al.

(10) Patent No.: US 12,782,969 B2
(45) Date of Patent: Nov. 3, 2026

(54) ELECTRONIC DEVICE, METHOD FOR CONTROLLING ELECTRONIC DEVICE, AND RECORDING MEDIUM

(71) Applicant: CASIO COMPUTER CO., LTD., Tokyo (JP)

(72) Inventors: Toshiaki Kanamura, Tokyo (JP); Kayoko Onoda, Tokyo (JP); Wataru Nimura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 79 days.

(21) Appl. No.: 18/887,419

(22) Filed: Sep. 17, 2024

(65) Prior Publication Data

US 2025/0103060 A1 Mar. 27, 2025

(30) Foreign Application Priority Data

Sep. 22, 2023 (JP) ................................ 2023-158718

(51) Int. Cl.

*H04B 17/00* (2015.01)
*G05D 1/656* (2024.01)
*H04B 17/318* (2015.01)
*G05D 105/30* (2024.01)
*G05D 111/30* (2024.01)

(52) U.S. Cl.

CPC ........... *G05D 1/656* (2024.01); *H04B 17/318* (2015.01); *G05D 2105/32* (2024.01); *G05D 2111/30* (2024.01)

(58) Field of Classification Search

None

See application file for complete search history.

(56) References Cited

U.S. PATENT DOCUMENTS

| | | | | |
|---|---|---|---|---|
| 11,135,726 | B2 * | 10/2021 | Hayashi | B25J 13/006 |
| 11,782,440 | B2 * | 10/2023 | Liu | G05D 1/692 701/23 |
| 2010/0298976 | A1 * | 11/2010 | Sugihara | A63H 11/20 700/258 |
| 2020/0206940 | A1 * | 7/2020 | Takada | A63H 11/00 |
| 2021/0039251 | A1 * | 2/2021 | Moon | B25J 11/0005 |
| 2021/0303964 | A1 * | 9/2021 | Hasegawa | G06N 3/008 |
| 2022/0288791 | A1 * | 9/2022 | Iida | G06F 16/909 |
| 2023/0373097 | A1 * | 11/2023 | Gewecke | B25J 9/163 |
| 2025/0164996 | A1 * | 5/2025 | Cristache | B60L 53/57 |
| 2025/0373294 | A1 * | 12/2025 | Amiri | H04B 7/0626 |

FOREIGN PATENT DOCUMENTS

| | | | |
|---|---|---|---|
| JP | 2001224867 | A | 8/2001 |
| JP | 2002239962 | A | 8/2002 |
| JP | 2020014845 | A | 1/2020 |

* cited by examiner

*Primary Examiner* — James M Mcpherson

(74) *Attorney, Agent, or Firm* — Holtz, Holtz & Volek PC

(57) ABSTRACT

In a robot, a processor updates a personality parameter representing a pseudo personality of an own device on the basis of a personality parameter representing a pseudo personality of another device in a case of an approaching state that is a state in which the own device approaches another device of the same type as the own device within a predetermined distance or a state in which a terminal device corresponding to another device approaches a terminal device corresponding to the own device within a predetermined distance.

13 Claims, 14 Drawing Sheets

*FIG. 7*

121

| No. | ACTION (ACTION NAME) | ACTION CONTROL PARAMETER | | | | | EXECUTION TIME LENGTH |
|---|---|---|---|---|---|---|---|
| | | TIME (ms) | OPERATION PARAMETER | | CRY PARAMETER | | |
| | | | TWIST MOTOR | UP-DOWN MOTOR | VOICE | VOLUME (dB) | |
| 1 | LOWERING HEAD | 100<br>100 | 0<br>0 | 0<br>−45 | – | – | 0.2 SECONDS |
| 2 | PEEPING | 300 | – | – | PEEP | 60 | 0.3 SECONDS |
| 3 | SHAKING HEAD | 100<br>100<br>100 | 0<br>34<br>−34 | 0<br>0<br>0 | – | – | 0.3 SECONDS |
| ⋮ | ⋮ | ⋮ | | | | | ⋮ |
| 101 | BEING SURPRISED | 100<br>100<br>700<br>500<br>400<br>500 | 0<br>0<br>0<br>34<br>−34<br>0 | 0<br>−24<br>−24<br>−24<br>−24<br>0 | KJAER | 70 | 2.3 SECONDS |
| 102 | SHOWING JOY | ... | ... | ... | ... | ... | ... |
| 103 | SHOWING SADNESS | ... | ... | ... | ... | ... | ... |
| ⋮ | ⋮ | ⋮ | | | | | ⋮ |

FIG. 8

124 (1)

| STATE PARAMETER | | CORRECTION COEFFICIENT | | | | | | | | | |
|---|---|---|---|---|---|---|---|---|---|---|---|
| | | UPWARD-DOWNWARD OPERATION | | | | RIGHT-LEFT OPERATION | | | | OPERATION START TIME LAG | |
| | | SPEED | | AMPLITUDE | | SPEED | | AMPLITUDE | | | |
| | | ACTING DIRECTION | WEIGHTING COEFFICIENT | ACTING DIRECTION | WEIGHTING COEFFICIENT | ACTING DIRECTION | WEIGHTING COEFFICIENT | ACTING DIRECTION | WEIGHTING COEFFICIENT | ACTING DIRECTION | WEIGHTING COEFFICIENT |
| (1) EMOTION | JOY | + | 0.2 | + | 0.2 | + | 0.2 | + | 0.2 | ±0 | 0 |
| | IRRITATION | + | 0.2 | + | 0.2 | + | 0.2 | + | 0.2 | − | 0.2 |
| | NORMAL | ±0 | 0 | ±0 | 0 | ±0 | 0 | ±0 | 0 | ±0 | 0 |
| | SADNESS | − | 0.2 | − | 0.2 | − | 0.2 | − | 0.2 | ±0 | 0 |
| | LETHARGY | − | 0.2 | − | 0.2 | − | 0.2 | − | 0.2 | + | 0.2 |
| (2) PERSONALITY | HAPPY | + | 0.1 | + | 0.1 | ±0 | 0 | ±0 | 0 | ±0 | 0 |
| | ACTIVE | + | 0.1 | + | 0.1 | + | 0.1 | + | 0.1 | − | 0.1 |
| | SHY | − | 0.1 | − | 0.1 | − | 0.1 | − | 0.1 | + | 0.1 |
| | WANTED | − | 0.1 | − | 0.1 | ±0 | 0 | ±0 | 0 | ±0 | 0 |

FIG. 9

124 (2)

| STATE PARAMETER | | CORRECTION COEFFICIENT | | | | | | | | | |
|---|---|---|---|---|---|---|---|---|---|---|---|
| | | UPWARD-DOWNWARD OPERATION | | | | RIGHT-LEFT OPERATION | | | | OPERATION START TIME LAG | |
| | | SPEED | | AMPLITUDE | | SPEED | | AMPLITUDE | | | |
| | | ACTING DIRECTION | WEIGHTING COEFFICIENT | ACTING DIRECTION | WEIGHTING COEFFICIENT | ACTING DIRECTION | WEIGHTING COEFFICIENT | ACTING DIRECTION | WEIGHTING COEFFICIENT | ACTING DIRECTION | WEIGHTING COEFFICIENT |
| (3) REMAINING BATTERY LEVEL | 70% OR MORE | ±0 | 0 | ±0 | 0 | ±0 | 0 | ±0 | 0 | ±0 | 0 |
| | 30% TO 70% | ±0 | 0 | ±0 | 0 | ±0 | 0 | ±0 | 0 | ±0 | 0 |
| | 30% OR LESS | – | 0.3 | – | 0.3 | – | 0.3 | – | 0.3 | – | 0.3 |
| (4) CURRENT LOCATION | HOME | ±0 | 0 | ±0 | 0 | ±0 | 0 | ±0 | 0 | ±0 | 0 |
| | FAMILIAR PLACE | ±0 | 0 | ±0 | 0 | ±0 | 0 | ±0 | 0 | ±0 | 0 |
| | UNFAMILIAR PLACE | – | 0.1 | – | 0.1 | – | 0.1 | – | 0.1 | ±0 | 0 |
| | NEW PLACE | – | 0.2 | – | 0.2 | – | 0.2 | – | 0.2 | + | 0.2 |
| (5) CURRENT TIME | IMMEDIATELY AFTER WAKE-UP | – | 0.2 | – | 0.2 | – | 0.2 | – | 0.2 | + | 0.2 |
| | DURING NAP | – | 0.1 | – | 0.1 | – | 0.1 | – | 0.1 | + | 0.1 |
| | IMMEDIATELY BEFORE SLEEP | – | 0.1 | – | 0.1 | – | 0.1 | – | 0.1 | + | 0.1 |

FIG. 11

125

| No. | ID | DATE AND TIME OF LATEST ENCOUNTER | CUMULATIVE NUMBER OF TIMES OF ENCOUNTERS | PERSONALITY PARAMETER | FRIEND REGISTRATION | INTIMACY | USER OPERATION HISTORY | |
|---|---|---|---|---|---|---|---|---|
| | | | | | | | OPERATION THAT GIVES JOY | OPERATION DISLIKED |
| 1 | 123456 | 23/01/02 10:30:00 | 21 | HAPPY: 6 ACTIVE: 5<br>WANTED: 4 SHY: 3 | ○ | 30.5 | 105 | 10 |
| 2 | 456789 | 22/12/15 14:45:30 | 2 | HAPPY: 3 ACTIVE: 4<br>WANTED: 2 SHY: 1 | – | 2 | 0 | 0 |
| 3 | 456123 | 23/03/03 12:30:15 | 1 | HAPPY: 1 ACTIVE: 4<br>WANTED: 4 SHY: 6 | – | 1 | 0 | 0 |
| ⋮ | ⋮ | ⋮ | ⋮ | ⋮ | ⋮ | ⋮ | ⋮ | ⋮ |

ELECTRONIC DEVICE, METHOD FOR CONTROLLING ELECTRONIC DEVICE, AND RECORDING MEDIUM

BACKGROUND

1. Technical Field

The present disclosure relates to an electronic device, a method for controlling the electronic device, and a recording medium.

2. Related Art

Electronic devices that simulate living things such as pets and humans are known. For example, JP 2003-285286 A discloses a robot device capable of making a user feel pseudo growth by operating a scenario corresponding to a value of a growth parameter.

SUMMARY

The present disclosure includes a control unit configured to update, in a case of an approaching state, a personality parameter representing a pseudo personality of an own device on the basis of a personality parameter representing a pseudo personality of another device, the approaching state being a state in which the own device approaches the another device of the same type as the own device within a predetermined distance or a state in which a terminal device corresponding to the another device approaches a terminal device corresponding to the own device within the predetermined distance.

According to the present disclosure, it is possible to provide an electronic device, a method for controlling the electronic device, and a recording medium capable of improving the animacy.

BRIEF DESCRIPTION OF THE DRAWINGS

FIG. 7 is a diagram illustrating an example of action information according to the first embodiment;

FIG. 9 is a second diagram illustrating an example of a coefficient table according to the first embodiment;

FIG. 11 is a diagram illustrating an example of encounter information according to the first embodiment;

DETAILED DESCRIPTION

Figure 1:
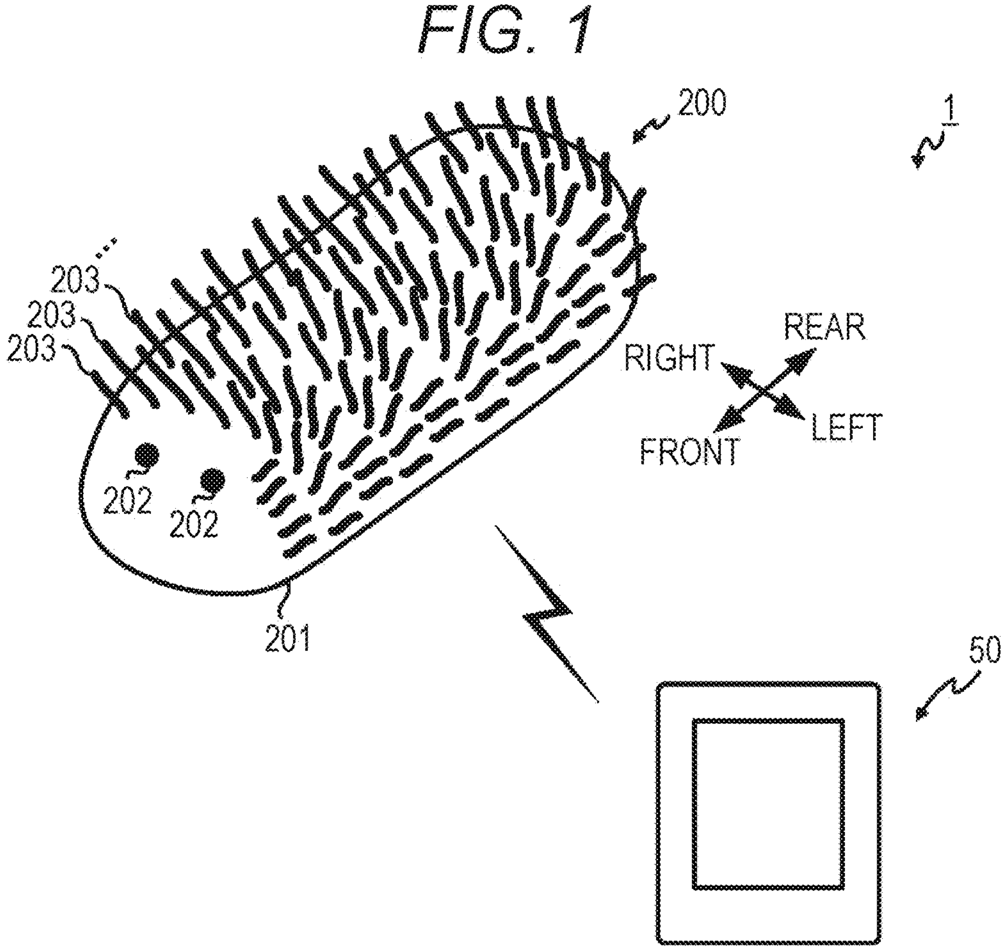
FIG. 1 is a diagram illustrating an overall configuration of a robot system according to a first embodiment.

Hereinafter, embodiments will be described with reference to the drawings. In the drawings, the same or corresponding parts are denoted by the same reference numerals.

First Embodiment

FIG. 1 schematically illustrates a configuration of a robot system 1 according to a first embodiment. The robot system 1 includes a robot 200 and a terminal device 50. The robot 200 is an example of an electronic device according to the first embodiment.

Figure 2:
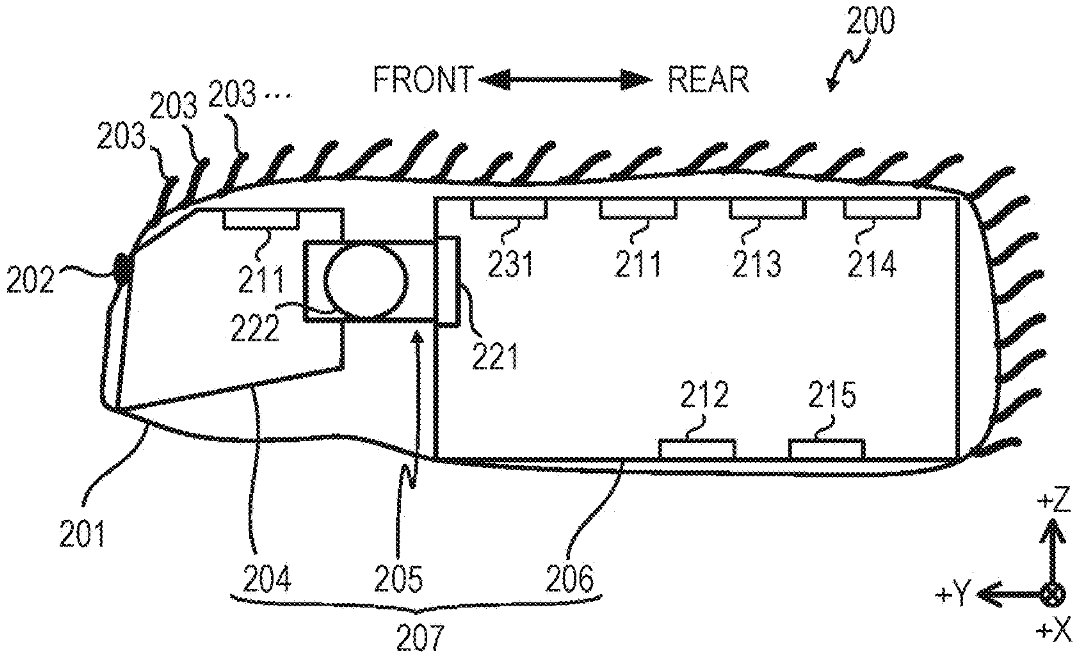
FIG. 2 is a cross-sectional view of a robot according to the first embodiment as viewed from a side surface.

The robot 200 according to the first embodiment includes an exterior 201, a decorative part 202, bushy bristles 203, a head portion 204, a connecting portion 205, a body portion 206, a housing 207, a touch sensor 211, an acceleration sensor 212, a microphone 213, an illuminance sensor 214, and a speaker 231 similar to those of the robot 200 disclosed in JP 2023-115370 A, and the description thereof will be omitted. Note that the shape of the head portion 204 may be the shape illustrated in FIG. 2 or the shape disclosed in, for example, FIG. 2 of JP 2023-115370 A.

The robot 200 according to the first embodiment includes a twist motor 221 and an up-down motor 222 similar to those of the robot 200 disclosed in JP 2023-115370 A, and the description thereof will be omitted. The twist motor 221 and the up-down motor 222 of the robot 200 according to the first embodiment operate similarly to those of the robot 200 disclosed in JP 2023-115370 A.

The robot 200 includes a gyro sensor 215. The robot 200 can detect a change in posture of the robot 200 itself by the acceleration sensor 212 and the gyro sensor 215, and can detect that the robot is lifted, redirected, or thrown by the user.

Note that at least a part of the acceleration sensor 212, the microphone 213, the gyro sensor 215, the illuminance sensor 214, and the speaker 231 may be provided, without being limited in the body portion 206, but in the head portion 204, or in both the body portion 206 and the head portion 204.

Figure 3:
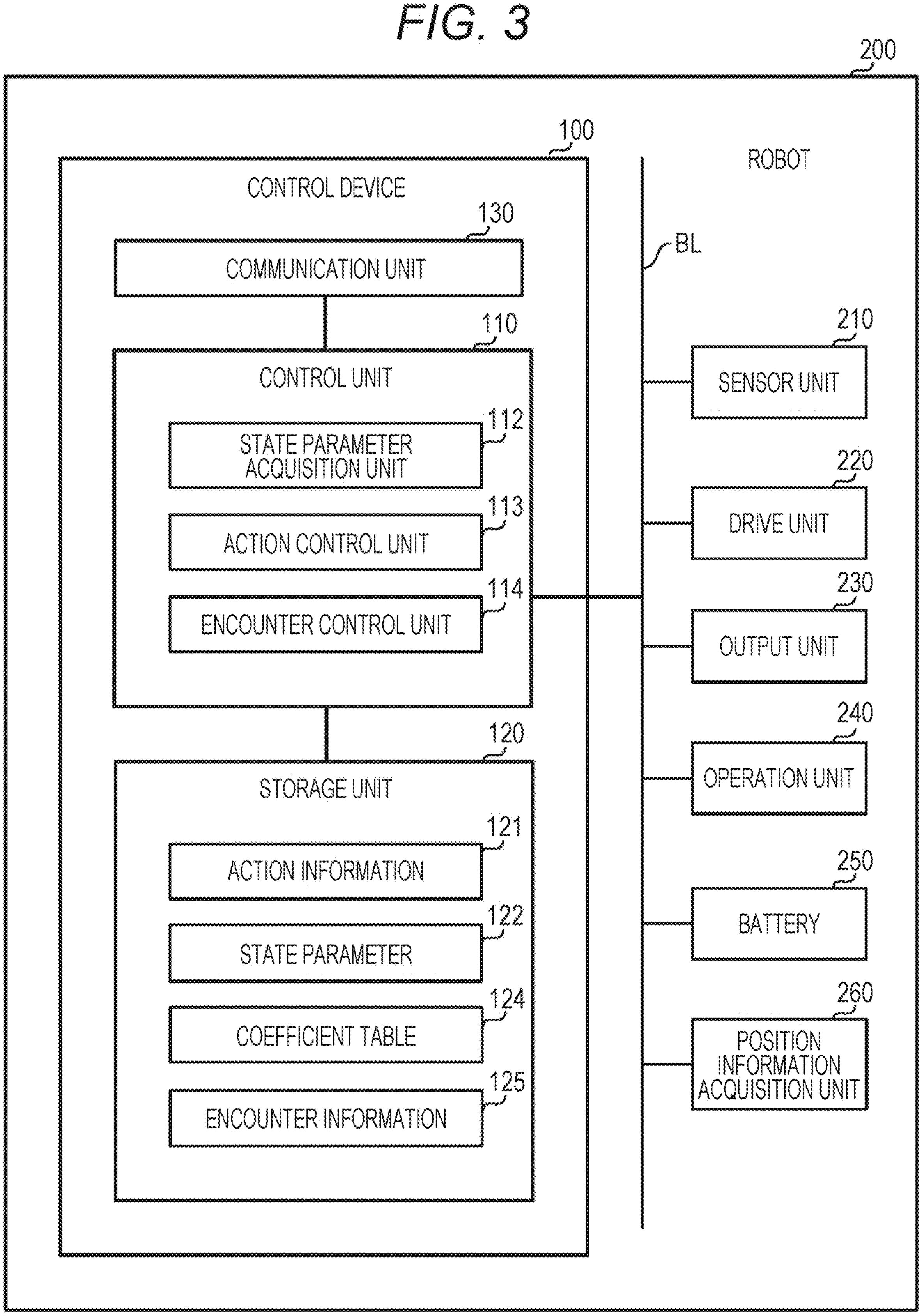
FIG. 3 is a block diagram illustrating a configuration of the robot according to the first embodiment.

Next, a functional configuration of the robot 200 will be described with reference to FIG. 3. As illustrated in FIG. 3, the robot 200 includes a control device 100, a sensor unit 210, a drive unit 220, an output unit 230, and an operation unit 240. These units are connected via a bus line BL, for example. Note that, instead of the bus line BL, a wired interface such as a universal serial bus (USB) cable or a wireless interface such as Bluetooth (registered trademark) may be used.

The control device 100 is a device that controls the robot 200. The control device 100 includes a control unit 110 which is an example of a control means, a storage unit 120 which is an example of a recording means, and a communication unit 130 which is an example of a communication means.

The control unit 110 includes a central processing unit (CPU). The CPU is, for example, a microprocessor or the like, and is a central arithmetic processing unit that executes various processes and calculations. In the control unit 110, the CPU reads a control program stored in a ROM and controls the entire operation of the robot 200 that is the own device while using the RAM as a work memory. Although not illustrated, the control unit 110 has a clock function, a timer function, and the like, and can measure date and time and the like. The control unit 110 may be referred to as "processor".

The storage unit 120 includes a read only memory (ROM), a random access memory (RAM), a flash memory, and the like. The storage unit 120 stores programs and data used by the control unit 110 to perform various processing including an operating system (OS) and an application program. Furthermore, the storage unit 120 stores data generated or acquired by the control unit 110 performing various processing.

The communication unit 130 includes a communication interface for communicating with a device outside the robot 200. For example, the communication unit 130 communicates with an external device including the terminal device 50 according to a well-known communication standard such as a wireless local area network (LAN), Bluetooth Low Energy (BLE (registered trademark)), or near field communication (NFC).

The sensor unit 210 includes the touch sensor 211, the acceleration sensor 212, the gyro sensor 215, the illuminance sensor 214, and the microphone 213 described above. The sensor unit 210 is an example of a detection means that detects an external stimulus.

The touch sensor 211 includes, for example, a pressure sensor or a capacitive sensor, and detects contact of any object. The control unit 110 can detect that the robot 200 is stroked or hit by the user on the basis of the detection value of the touch sensor 211.

The acceleration sensor 212 detects acceleration applied to the body portion 206 of the robot 200. The acceleration sensor 212 detects acceleration in each of an X-axis direction, a Y-axis direction, and a Z-axis direction, that is, acceleration in three axes.

For example, the acceleration sensor 212 detects gravitational acceleration when the robot 200 is stationary. The control unit 110 can detect the current posture of the robot 200 on the basis of the gravitational acceleration detected by the acceleration sensor 212. In other words, the control unit 110 can detect whether or not the housing 207 of the robot 200 is inclined from the horizontal direction on the basis of the gravitational acceleration detected by the acceleration sensor 212. In this manner, the acceleration sensor 212 functions as an inclination detection means that detects the inclination of the robot 200.

Furthermore, in a case where the user lifts or throws the robot 200, the acceleration sensor 212 detects an acceleration accompanying the movement of the robot 200 in addition to the gravitational acceleration. Therefore, the control unit 110 can detect the motion of the robot 200 by removing the component of the gravitational acceleration from the detection value detected by the acceleration sensor 212.

The gyro sensor 215 detects an angular velocity when rotation is applied to the body portion 206 of the robot 200. Specifically, the gyro sensor 215 detects angular velocities of three-axis rotation, that is, rotation about the X-axis direction, rotation about the Y-axis direction, and rotation about the Z-axis direction. By combining the detection value detected by the acceleration sensor 212 and the detection value detected by the gyro sensor 215, the motion of the robot 200 can be detected more accurately.

Note that the touch sensor 211, the acceleration sensor 212, and the gyro sensor 215 detect the intensity of the contact, the acceleration, and the angular velocity, respectively, at synchronized timing (for example, every 0.25 seconds), and output the detection values to the control unit 110.

The microphone 213 detects sound around the robot 200. Based on the sound component detected by the microphone 213, the control unit 110 can detect, for example, that the user is speaking to the robot 200 and that the user is clapping the user's hands for the robot 200.

The illuminance sensor 214 detects illuminance around the robot 200. The control unit 110 can detect, based on the illuminance detected by the illuminance sensor 214, that the surroundings of the robot 200 have become brighter or darker.

The control unit 110 acquires detection values detected by various sensors included in the sensor unit 210 as external stimuli via the bus line BL. The external stimulus is a stimulus that acts on the robot 200 from the outside of the robot 200. Examples of the external stimulus include "hearing loud sound", "being spoken to", "being stroked", "being lifted", "being turned upside down", "becoming brighter", "becoming darker", and the like.

For example, the control unit 110 acquires, by the microphone 213, an external stimulus due to "hearing loud sound" or "being spoken to", and acquires, by the touch sensor 211, an external stimulus due to "being stroked". Furthermore, the control unit 110 acquires an external stimulus due to "being lifted" or "being turned upside down" by the acceleration sensor 212 and the gyro sensor 215, and acquires an external stimulus due to "becoming brighter" or "becoming darker" by the illuminance sensor 214.

Note that the sensor unit 210 may include a sensor other than the touch sensor 211, the acceleration sensor 212, the gyro sensor 215, and the microphone 213. By increasing the types of sensors included in the sensor unit 210, the types of external stimuli that can be acquired by the control unit 110 can be increased.

The drive unit 220 includes the twist motor 221 and the up-down motor 222, and is driven by the control unit 110. The twist motor 221 is a servomotor for rotating the head portion 204 in the right-left direction (width direction) around the front-rear direction as an axis with respect to the body portion 206. The up-down motor 222 is a servomotor for rotating the head portion 204 in the up-down direction (height direction) about the right-left direction with respect to the body portion 206. The robot 200 can express operation of laterally twisting the head portion 204 by the twist motor 221, and can express operation of raising and lowering the head portion 204 by the up-down motor 222.

The output unit 230 includes a speaker 231, and when the control unit 110 inputs sound data to the output unit 230, sound is output from the speaker 231. For example, when the control unit 110 inputs the data of the cry of the robot 200 to the output unit 230, the robot 200 emits a pseudo cry.

Note that, instead of the speaker 231 or in addition to the speaker 231, a display such as a liquid crystal display or a light emitting unit such as a light emitting diode (LED) may be provided as the output unit 230, and emotions such as joy and sadness may be displayed on the display or expressed by the color or brightness of emitted light.

The operation unit 240 includes an operation button, a volume-control knob, and the like. The operation unit 240 is, for example, an interface for receiving a user operation such as on/off of a power supply, volume adjustment of an output sound, or the like.

A battery 250 is a rechargeable secondary battery, and stores electric power used in the robot 200. The battery 250 is charged when the robot 200 moves to the charging station.

A position information acquisition unit 260 includes a position information sensor such as a global positioning system (GPS), and acquires current position information of the robot 200. Note that the position information acquisition unit 260 may acquire the position information of the robot 200 through, not limited to the GPS, a general method using wireless communication or may acquire the position information of the robot 200 through application software of the terminal device 50.

The control unit 110 functionally includes a state parameter acquisition unit 112 which is an example of a state parameter acquisition means, an action control unit 113 which is an example of an action control means, and an encounter control unit 114 which is an example of an encounter control means. In the control unit 110, the CPU functions as these units by reading a program stored in the ROM into the RAM and executing and controlling the program.

Furthermore, the storage unit 120 stores action information 121, a state parameter 122, a coefficient table 124, and encounter information 125.

Figure 4:
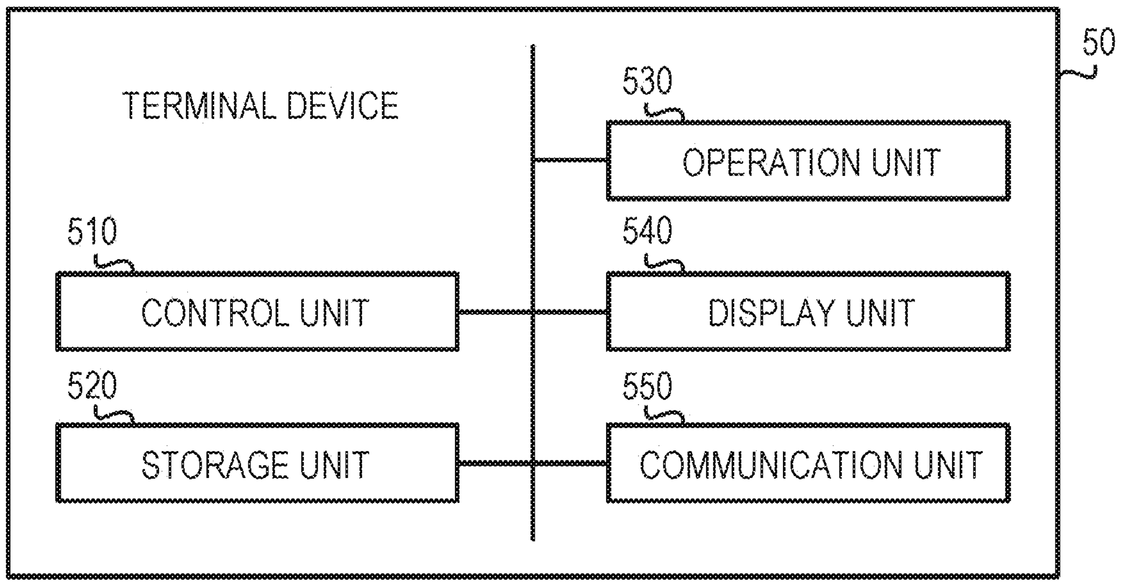
FIG. 4 is a block diagram illustrating a configuration of a terminal device according to the first embodiment.

Next, a configuration of the terminal device 50 will be described with reference to FIG. 4. The terminal device 50 is an operation terminal operated by a user. The terminal device 50 is a general-purpose information processing device such as a smartphone, a tablet terminal, a wearable terminal, or the like. As illustrated in FIG. 4, the terminal device 50 includes a control unit 510, a storage unit 520, an operation unit 530, a display unit 540, and a communication unit 550.

The control unit 510 includes a CPU. In the control unit 110, the CPU reads a control program stored in a ROM and controls the entire operation of the terminal device 50 while using the RAM as a work memory. The control unit 510 may be referred to as "processor".

The storage unit 520 includes a ROM, a RAM, a flash memory, and the like. The storage unit 520 stores programs and data used by the control unit 510 to perform various processing. Furthermore, the storage unit 520 stores data generated or acquired by the control unit 510 performing various processing.

The operation unit 530 includes an input device such as a touch panel, a touch pad, and a physical button, and receives an operation input from a user.

The display unit 540 includes a display device such as a liquid crystal display, and displays various images under control by the control unit 510. The display unit 540 is an example of a display means.

The communication unit 550 includes a communication interface for communicating with a device outside the terminal device 50. For example, the communication unit 550 communicates with an external device including the robot 200 according to a well-known communication standard such as a wireless LAN, BLE (registered trademark), or NFC.

Returning to FIG. 3, in the control device 100 of the robot 200, the state parameter acquisition unit 112 acquires the state parameter 122. The state parameter 122 is a parameter for representing a state of the robot 200. Specifically, the state parameter 122 includes (1) an emotion parameter, (2) a personality parameter, (3) a remaining battery level, (4) the current location, (5) the current time, and (6) the number of growth days (the number of raising days).

(1) Emotion Parameter

The emotion parameter is a parameter representing a pseudo emotion to the robot 200. The emotion parameter is expressed by coordinates (X, Y) on an emotion map 300.

The emotion map 300 is similar to that disclosed in JP 2023-115370 A, and description thereof will be omitted.

The state parameter acquisition unit 112 calculates an emotion change amount that is a change amount for increasing or decreasing the X value and the Y value of the emotion parameter. The emotion change amount is expressed by the following four variables.

DXP: ease of feeling secure (ease of changing X value in positive direction in emotion map)

DXM: ease of feeling anxious (ease of changing X value in negative direction in emotion map)

DYP: ease of feeling excited (ease of changing Y value in positive direction in emotion map)

DYM: ease of feeling lethargic (easiness of changing Y value in negative direction in emotion map)

The state parameter acquisition unit 112 updates the emotion parameter by adding or subtracting a value corresponding to an external stimulus among the emotion change amounts DXP, DXM, DYP, and DYM to or from the current emotion parameter. For example, since the pseudo emotion of the robot 200 is made feel secure when the head portion 204 is stroked, the state parameter acquisition unit 112 adds DXP to the X value of the emotion parameter. Conversely, since the pseudo emotion of the robot 200 is made feel anxious when the head portion 204 is hit, the state parameter acquisition unit 112 subtracts DXM from the X value of the emotion parameter. What kind of emotion change amount is associated with various external stimuli can be arbitrarily set. An example will be described below.

The head portion 204 is stroked (feel secure): X=X+DXP

The head portion 204 is hit (feel anxious): X=X-DXM (These external stimuli can be detected by the touch sensor 211 of the head portion 204)

The body portion 206 is stroked (feel excited): Y=Y+DYP

The body portion 206 is hit (feel lethargic): Y=Y-DYM (These external stimuli can be detected by the touch sensor 211 of the body portion 206)

Hugged with the head up (feel joy): X=X+DXP and Y=Y+DYP

Hanged in the midair with the head down (feel sad): X=X−DXM and Y=Y−DYM (These external stimuli can be detected by the touch sensor 211 and the acceleration sensor 212)

Spoken to with a gentle voice (feel calm): X=X+DXP and Y=Y−DYM

Yelled at with a loud voice (feel irritated): X=X−DXM and Y=Y+DYP (These external stimuli can be detected by the microphone 213)

The sensor unit 210 acquires a plurality of external stimuli of different types by a plurality of sensors. The state parameter acquisition unit 112 variously derives the emotion change amount in accordance with each of the plurality of external stimuli, and sets the emotion parameter according to the derived emotion change amount.

The initial values of the emotion change amounts DXP, DXM, DYP, and DYM are 10, and increase up to 20. The state parameter acquisition unit 112 updates each variable of the emotion change amounts DXP, DXM, DYP, and DYM in accordance with the external stimulus to be detected by the sensor unit 210.

More specifically, in one day, the state parameter acquisition unit 112 adds 1 to DXP if the X value of the emotion parameter is set to the maximum value of the emotion map 300 even once, and adds 1 to DYP if the Y value of the emotion parameter is set to the maximum value of the emotion map 300 even once. Furthermore, in one day, the state parameter acquisition unit 112 adds 1 to DXM if the X value of the emotion parameter is set to the minimum value of the emotion map 300 even once, and adds 1 to DYM if the Y value of the emotion parameter is set to the minimum value of the emotion map 300 even once.

As described above, the state parameter acquisition unit 112 changes the emotion change amount in accordance with the condition based on whether the value of the emotion parameter reaches the maximum value or the minimum value of the emotion map 300. This update processing changes the emotion change amount, that is, the degree of change in emotion.

For example, when only the head portion 204 is stroked many times, only DXP of the emotion change amount increases, and the other emotion change amounts do not change. Therefore, the robot 200 has a personality that is easy to feel secure. Furthermore, when only the head portion 204 is hit many times, only the DXM of the emotion change amount increases, and the other emotion change amounts do not change. Therefore, the robot 200 has a personality that is easy to feel anxious. As described above, the state parameter acquisition unit 112 changes the emotion change amount in accordance with various external stimuli.

(2) Personality Parameter

The personality parameter is a parameter representing a pseudo personality of the robot 200. The personality parameter includes a plurality of personality values each representing a degree of different personalities. The state parameter acquisition unit 112 changes a plurality of personality values included in the personality parameter in accordance with the external stimulus detected by the sensor unit 210.

More specifically, the state parameter acquisition unit 112 calculates four personality values in accordance with the following (Equation 1). That is, a value obtained by subtracting 10 from DXP representing ease of feeling secure is set as a personality value (happy), a value obtained by subtracting 10 from DXM representing ease of feeling anxious is set as a personality value (shy), a value obtained by subtracting 10 from DYP representing ease of feeling excited is set as a personality value (active), and a value obtained by subtracting 10 from DYM indicating ease of feeling lethargic is set as a personality value (wanted).

$$\text{Personality value (happy)} = DXP - 10 \qquad \text{(Equation 1)}$$

$$\text{Personality value (shy)} = DXM - 10$$

$$\text{Personality value (active)} = DYP - 10$$

$$\text{Personality value (wanted)} = DYM - 10]$$

Figure 6:
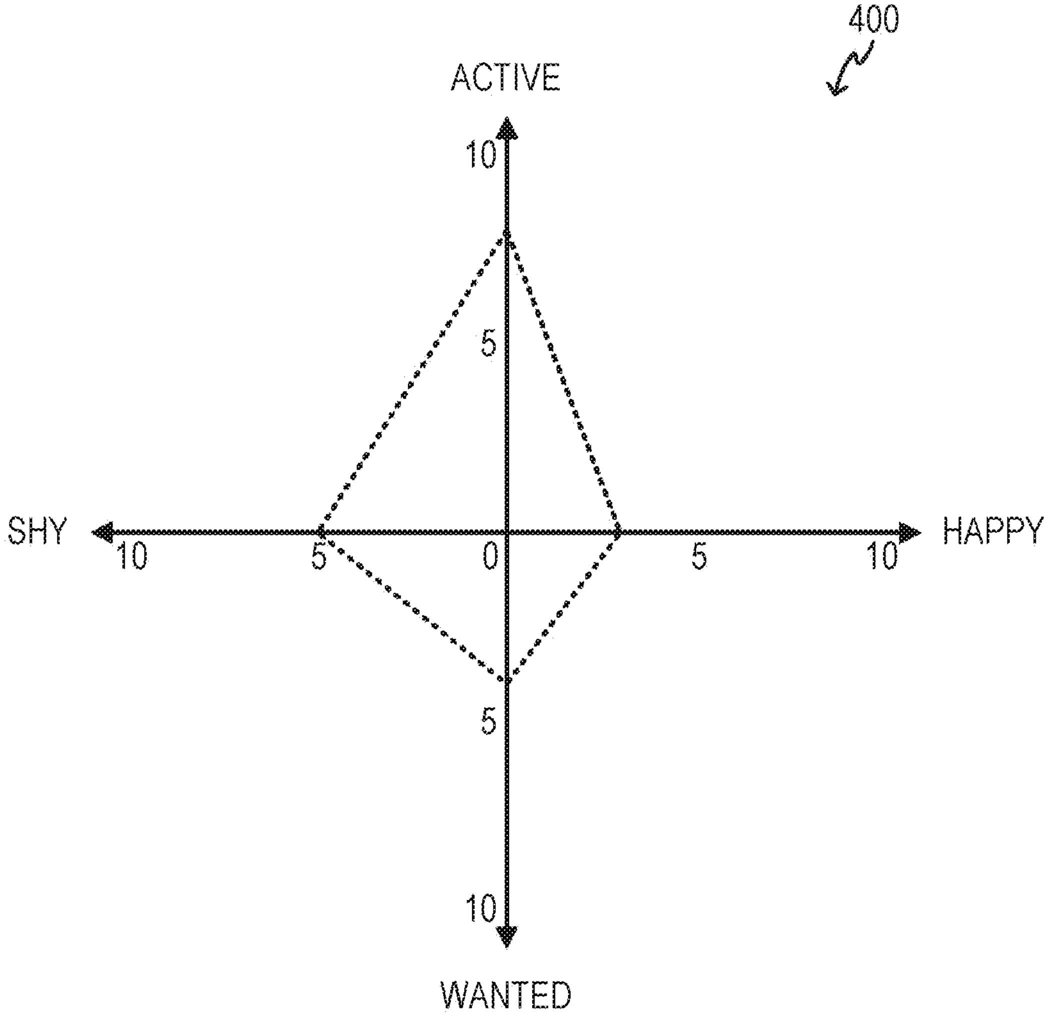
FIG. 6 is a diagram illustrating an example of a personality value radar chart according to the first embodiment.

As a result, as illustrated in FIG. 6, a personality value radar chart 400 can be generated by plotting the personality value (happy) on the first axis, the personality value (active) on the second axis, the personality value (shy) on the third axis, and the personality value (wanted) on the fourth axis. Since each variable of the emotion change amount has an initial value of 10 and increases up to 20, the range of the personality value is 0 or more and 10 or less.

The personality value radar chart 400 is similar to that disclosed in JP 2023-115370 A, and the description thereof will be omitted.

As described above, the robot 200 has various personalities according to the attitude of the user to the robot 200. That is, the personality of the robot 200 is formed to be different from each other depending on the attitude of the user.

Such four personality values are fixed when the pseudo growth of the robot 200 is completed after the child period has elapsed. Even in the subsequent adult period, the state parameter acquisition unit 112 adjusts four personality correction values (happy correction value, active correction value, shy correction value, and wanted correction value) in order to correct the personality in accordance with the attitude of the user to the robot 200.

The state parameter acquisition unit 112 adjusts the four personality correction values in accordance with a condition based on which area the emotion parameter has been present for the longest time on the emotion map 300. Specifically, four personality correction values are adjusted as (A) to (E) below.

(A) If the longest presence area is a secure area on the emotion map 300, the state parameter acquisition unit 112 adds 1 to the happy correction value and subtracts 1 from the shy correction value.

(B) If the longest presence area is an excited area on the emotion map 300, the state parameter acquisition unit 112 adds 1 to the active correction value and subtracts 1 from the wanted correction value.

(C) If the longest presence area is an anxious area on the emotion map 300, the state parameter acquisition unit 112 adds 1 to the shy correction value and subtracts 1 from the happy correction value.

(D) If the longest presence area is a lethargic area on the emotion map 300, the state parameter acquisition unit 112 adds 1 to the wanted correction value and subtracts 1 from the active correction value.

(E) If the longest presence area is the center area on the emotion map 300, the state parameter acquisition unit 112 decreases all the absolute values of the four personality correction values by 1.

After setting the four personality correction values, the state parameter acquisition unit 112 calculates the four personality values according to the following (Equation 2).

$$\text{Personality value (happy)} = DXP - 10 + \text{happy correction value} \qquad \text{(Equation 2)}$$

$$\text{Personality value (shy)} = DXM - 10 + \text{shy correction value}$$

$$\text{Personality value (active)} = DYP - 10 + \text{active correction value}$$

$$\text{Personality value (wanted)} = DYM - 10 + \text{wanted correction value}$$

(3) Remaining Battery Level

The remaining battery level is a remaining amount of power stored in the battery 250, and is a parameter representing a pseudo degree of hunger of the robot 200. The state parameter acquisition unit 112 acquires information on the current remaining battery level by a power supply control unit that controls charge and discharge of the battery 250.

(4) Current Location

The current location is a location where the robot 200 is currently located. The position information acquisition unit 260 of the state parameter acquisition unit 112 acquires information on the current location of the robot 200.

In a case where the current location matches the position with the highest recording frequency, the state parameter acquisition unit 112 determines that the current location is the home. In a case where the current location is not the home, the state parameter acquisition unit 112 determines whether the current location is a new place, a familiar place, or an unfamiliar place on the basis of the number of past records of the place, and acquires the determination information. For example, the state parameter acquisition unit 112 determines that the current location is a familiar place in a case where the number of past records is 5 times or more, and determines that the current location is an unfamiliar place in a case where the number of past records is less than 5 times.

(5) Current Time

The current time is the present time. The state parameter acquisition unit 112 acquires the current time by a clock mounted on the robot 200. Note that, similarly to the acquisition of the position information, the acquisition of the current time is not limited to this method.

More specifically, the state parameter acquisition unit 112 refers to the ON/OFF log of the pseudo sleep of the robot 200, and determines whether the current time is immediately after the wake-up time of today, immediately before the bedtime, or corresponds to the nap time zone.

(6) Number of Growth Days (Number of Raising Days)

The number of growth days represents the number of days of pseudo growth of the robot 200. The robot 200 is created in a pseudo manner at the time of the first activation by the user after the shipment from the factory, and grows from a child to an adult over a predetermined growth period. The number of growth days corresponds to the number of days from the pseudo birth of the robot 200.

The initial value of the number of growth days is 1, and the state parameter acquisition unit 112 adds 1 to the number of growth days each time one day passes. A growth period during which the robot 200 grows from a child to an adult is, for example, 50 days, and a period during which the number of growth days from the pseudo birth is 50 days is referred to as "child period". When the child period has elapsed, the pseudo growth of the robot 200 is completed. The period after completion of the child period is referred to as "adult period".

During the child period, the state parameter acquisition unit 112 expands both the maximum value and the minimum value of the emotion map 300 by 2 every time the number of pseudo growth days of the robot 200 increases by one day. As an initial value of the size of the emotion map 300, both the X value and the Y value have the maximum value of 100 and the minimum value of −100 as illustrated in a frame 301. When the number of growth days has elapsed a half (for example, 25 days) of the child period, both the X value and the Y value have the maximum value of 150 and the minimum value of −150 as illustrated in a frame 302. When the child period has elapsed, the pseudo growth of the robot 200 stops. At this time, as shown in a frame 303, both the X value and the Y value have a maximum value of 200 and a minimum value of −200. Thereafter, the size of the emotion map 300 is fixed.

The settable range of the emotion parameter is determined by the emotion map 300. Therefore, as the size of the emotion map 300 expands, the range of the emotion parameters that can be set increases. The expansion of the settable range of the emotion parameter enables richer emotion expression, so that the pseudo growth of the robot 200 is expressed by the expansion of the size of the emotion map 300.

Returning to FIG. 3, the action control unit 113 causes the robot 200 to execute various actions according to the situation on the basis of the action information 121. The action information 121 is information that defines an action to be executed by the robot 200. Here, the action is a behavior, an act, or the like of the robot 200. Specifically, as illustrated in FIG. 7, the actions include "lowering the head", "peeping", "shaking the head", "being surprised", "showing joy", "showing sadness", and the like. Furthermore, in addition to the actions illustrated in FIG. 7, for example, various actions such as "laughing", "becoming angry", "sneezing", "breathing", and the like can be exemplified. Each action is configured by a combination of a plurality of elements that are operations or voice outputs.

The operation means a physical motion of the robot 200 executed by the drive of the drive unit 220. Specifically, the operation corresponds to moving the head portion 204 with respect to the body portion 206 by the twist motor 221 or the up-down motor 222. The voice output means that various voices such as a cry are output from the speaker 231 of the output unit 230.

As illustrated in FIG. 7, the action information 121 defines action control parameters for each of a plurality of actions executable by the robot 200. The action control parameter is a parameter for causing the robot 200 to execute each action. The action control parameter defines an operation parameter or a cry parameter and a time (milliseconds) for executing the element for each element constituting the action. The operation parameter defines the operating angle of the twist motor 221 and the operating angle of the up-down motor 222. The cry parameter defines a voice and a volume.

As an example, in a case of causing the robot 200 to execute an action of "lowering the head", the action control unit 113 first controls the twist motor 221 and the up-down motor 222 so that the angle becomes 0 after 100 milliseconds, and controls the angle of the up-down motor 222 to become −45 after 100 milliseconds. In a case of causing the robot 200 to execute an action of "peeping", the action control unit 113 outputs a voice of "Peep!" for 300 milliseconds from the speaker 231 at a volume of 60 dB. In a case of causing the robot 200 to execute an action of "shaking the head", the action control unit 113 first controls the twist motor 221 and the up-down motor 222 so that the angle becomes 0 after 100 milliseconds, and controls the drive unit 220 so that the angle of the twist motor 221 becomes 34 after 100 milliseconds and the angle of the twist motor 221 becomes −34 after 100 milliseconds.

In addition, the action information 121 shown in FIG. 7 defines actions such as "being surprised", "showing joy", and "showing sadness" as more complicated actions. In a case of causing the robot 200 to execute an action of "being surprised", the action control unit 113 first controls the twist motor 221 and the up-down motor 222 so that the angle becomes 0 after 100 milliseconds, and controls the angle of the up-down motor 222 to become −24 after 100 milliseconds. Then, the action control unit 113 performs control so that rotation is not performed for 700 milliseconds thereafter and the angle of the twist motor 221 becomes 34 and the angle of the up-down motor 222 becomes −24, 500 milliseconds thereafter. Then, the action control unit 113 performs control so that the angle of the twist motor 221 becomes −34, 400 milliseconds thereafter and the angle of the twist motor 221 and the up-down motor 222 becomes 0, 500 milliseconds thereafter. Furthermore, in parallel with the driving of the twist motor 221 and the up-down motor 222, the action control unit 113 outputs a voice "Kjaer!" with a volume of 70 dB from the speaker 231. Note that, in FIG. 7, action control parameters of actions such as "showing joy" and "showing sadness" are omitted, but are determined by a combination of the operation (motion) by the twist motor 221 or the up-down motor 222 and the voice output (cry) from the speaker 231, similarly to "being surprised".

The action information 121 determines an action to be executed by the robot 200 by combining such an operation (motion) or voice output (cry). The action information 121 may be incorporated in the robot 200 in advance. Alternatively, the action information 121 may be freely created by the user operating the terminal device 50.

Each action defined in the action information 121 is associated in advance with a trigger that is a condition for the robot 200 to execute the action. Specifically, the trigger can have various conditions such as "being spoken to", "being stroked", "being lifted", "being turned upside down", "becoming brighter", "becoming darker", and the like. These triggers are triggers based on external stimuli and are detected by the sensor unit 210. For example, "being spoken to" is detected by the microphone 213. The "being stroked" is detected by the touch sensor 211. "Being lifted" and "being turned upside down" are detected by the acceleration sensor 212 or the gyro sensor 215. "Becoming brighter" and "becoming darker" are detected by the illuminance sensor 214. Note that the trigger may not be based on an external stimulus, such as "arrival of a specific time", "movement of the robot 200 to a specific place", or the like.

The action control unit 113 determines whether or not any trigger among triggers of a plurality of actions defined in the action information 121 has been established on the basis of a detection result or the like by the sensor unit 210. For example, the action control unit 113 determines whether or not any trigger predetermined in the action information 121 has been established, such as whether the user's voice has been recognized, the head portion 204 of the robot 200 has been stroked, a specific time has arrived, or the robot 200 has moved to a specific location. As a result of the determination, in a case where any trigger has been established, the robot 200 is caused to execute an action corresponding to the established trigger.

In a case where any trigger has been established, the action control unit 113 refers to the action information 121 and specifies the action control parameter set to the action corresponding to the established trigger. More specifically, the action control unit 113 specifies, as the action control parameter, a combination of an operation or a cry which is an element constituting the action corresponding to the established trigger, execution start timing of each element, and an operation parameter or a cry parameter which is a parameter of each element. Then, the action control unit 113 drives the drive unit 220 on the basis of the specified action control parameter or outputs a voice from the speaker 231 to cause the robot 200 to execute an action corresponding to the established trigger.

More specifically, the action control unit 113 modifies the action control parameter specified from the action information 121 on the basis of the state parameter 122 acquired by the state parameter acquisition unit 112. As a result, the action can be changed according to the current state of the robot 200, making it possible to simulate living things realistically.

In order to correct the action control parameter, the action control unit 113 refers to the coefficient table 124. As illustrated in FIGS. 8 and 9, the coefficient table 124 defines correction coefficients for each of (1) the emotion parameter, (2) the personality parameter, (3) the remaining battery level, (4) the current location, and (5) the current time, which are the state parameters 122. Although not illustrated in the coefficient table 124, a correction coefficient may be defined for (6) the number of growth days.

The correction coefficient is a coefficient for correcting the action control parameter specified from the action information 121. Specifically, the correction coefficient is defined by the acting direction and the weighting coefficient with respect to the speed and the amplitude of the upward-downward operation by the up-down motor 222, the speed and the amplitude of the right-left operation by the twist motor 221, and the operation start time lag.

More specifically, the action control unit 113 determines which corresponds to the current state of the robot 200 indicated by the state parameter 122 acquired by the state parameter acquisition unit 112 for each of (1) to (5) below. Then, the action control unit 113 corrects the action control parameter using the correction coefficient corresponding to the current state of the robot 200.

Figure 5:
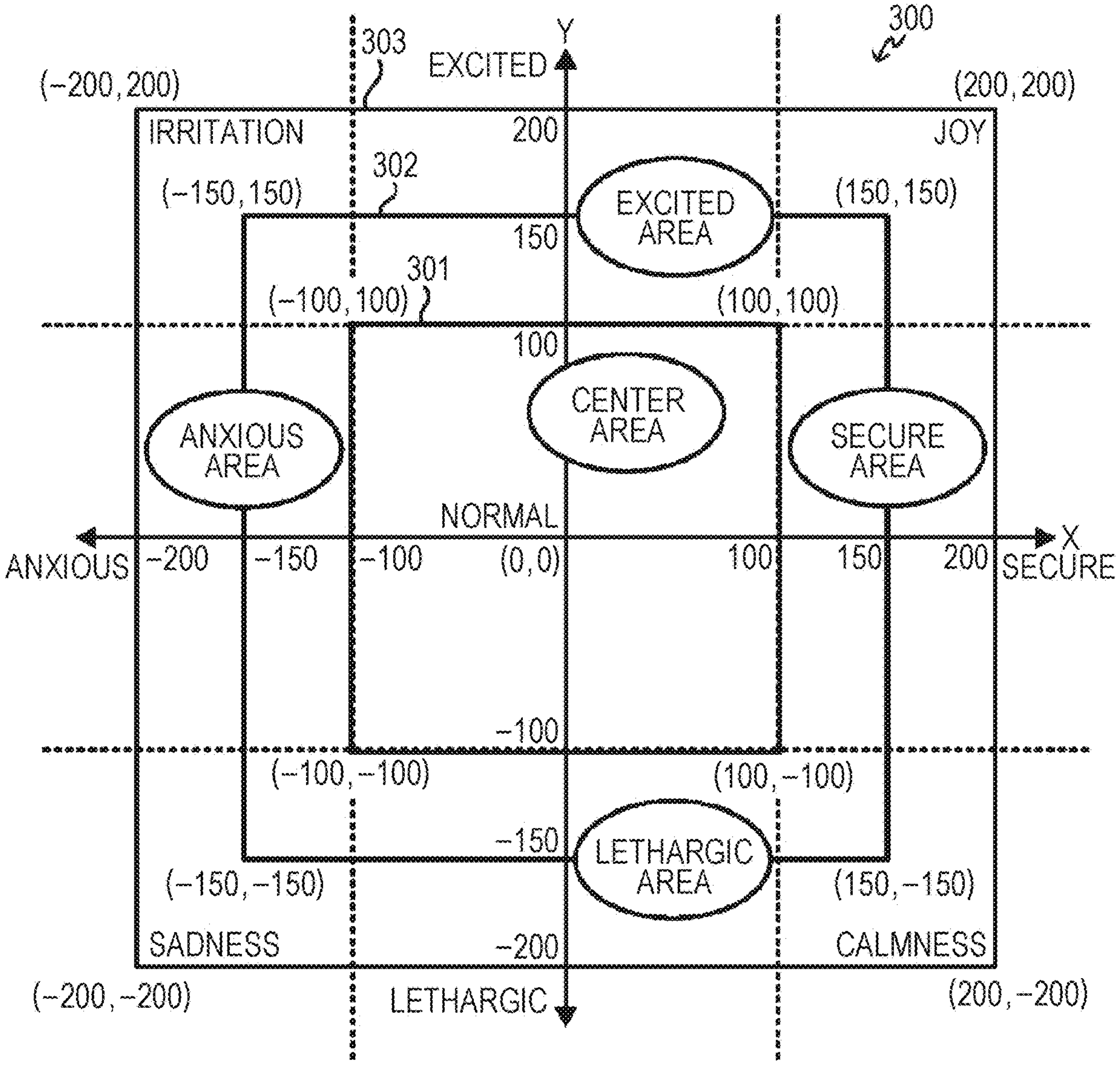
FIG. 5 is a diagram illustrating an example of an emotion map according to the first embodiment.

(1) Which of joy, irritation, sadness, lethargy, or normal corresponds to the current emotion parameter of the robot 200. In other words, whether the coordinates (X, Y) representing the emotion parameters are located in areas described as "joy", "irritation", "sadness", "lethargy", and "normal" on the emotion map 300 illustrated in FIG. 5.

(2) Which of happy, active, shy, or wanted corresponds to the current personality parameter of the robot 200. In other words, which of the four personality values of happy, active, shy, and wanted is the largest.

(3) Whether the current remaining battery level of the robot 200 is 70% or more, between 70% and 30%, or 30% or less.

(4) Whether the current location of the robot 200 is the home, a familiar place, an unfamiliar place, or a new place.

(5) Whether the current time is immediately after wake-up, during a nap, or immediately before sleep.

As an example, in the coefficient table 124 illustrated in FIG. 9, in a case where the current time corresponds to immediately after wake-up, it is defined that the acting direction is "−" for both the speed and the amplitude, and the weighting coefficient is "0.2" for each of the upward-downward operation and the right-left operation. Therefore, the action control unit 113 makes the operation time longer by 20% and the operation distance shorter by 20% on the basis of the value acquired from the action information 121. In other words, the action control unit 113 makes the operation of the robot 200 slower by 20% and smaller by 20% than usual.

Furthermore, in the coefficient table 124 illustrated in FIG. 9, it is defined that the acting direction of the operation start time lag is "+", and the weighting coefficient is "0.2". Therefore, the action control unit 113 makes the execution start timing slower than usual by 20% on the basis of the value set in the action information 121. By the correction using such a correction coefficient, it can be expressed that the action is executed in a slightly slower operation than the normal operation in the sleepy state immediately after wake-up.

The action control unit 113 specifies the correction coefficient of the corresponding state from the coefficient table 124 for each state of (1) the emotion parameter, (2) the personality parameter, (3) the remaining battery level, and (4) the current location in addition to (5) the current time. Then, the action control unit 113 corrects the action control parameter using the sum of the corresponding correction coefficients in (1) to (5).

As a specific example, there will be described a case where (1) the current emotion parameter corresponds to joy, (2) the current personality parameter corresponds to happy, (3) the current remaining battery level corresponds to 30% or less, (4) the current location corresponds to a new place, and (5) the current time corresponds to immediately after wake-up.

In this case, referring to the coefficient table 124 illustrated in FIGS. 8 and 9, the sum of the correction coefficients in each of the speed and the amplitude of the upward-downward operation is expressed as "+0.2+0.1−0.3−0.2−0.2 =−0.4" and the sum of the correction coefficients at each of the speed and the amplitude of the right-left operation is calculated as "+0.2+0−0.3−0.2−0.2=−0.5". Therefore, the action control unit 113 makes the operation time by the up-down motor 222 longer by 40% and makes the operation distance shorter by 40% on the basis of the value set in the action information 121. In addition, the action control unit 113 makes the operation time by the twist motor 221 longer by 50% and makes the operation distance shorter by 50% on the basis of the value acquired from the action information 121.

Furthermore, the sum of the correction coefficients of the operation start time lag is calculated as "+0+0+0.3+0.2+0.2=+0.7". Therefore, the action control unit 113 makes the execution start timing slower than usual by 70% on the basis of the value acquired from the action information 121.

Note that, in the coefficient table 124, although not illustrated, a correction coefficient is also defined for a cry similarly to the operation. More specifically, the action control unit 113 corrects the volume, which is the cry parameter set for the action corresponding to the trigger established by the action information 121, using the correction coefficient corresponding to the state parameter 122 acquired by the state parameter acquisition unit 112.

As described above, the action control unit 113 corrects the action control parameter on the basis of the state parameter 122 acquired by the state parameter acquisition unit 112. Then, the action control unit 113 drives the drive unit 220 on the basis of the corrected action control parameter or outputs a voice from the speaker 231 to cause the robot 200 to execute an action corresponding to the established trigger. By correcting the action control parameter on the basis of the state parameter 122, even in a case where the robot 200 executes the same action, there is a difference in the action to be executed according to the current state (emotion, personality, remaining battery level, current location, current time, and the like) of the robot 200. For example, even in a case where the robot 200 executes the same action "showing joy", there is a difference in the action to be executed between a case where the pseudo emotion corresponds to "joy" and a case where the pseudo emotion corresponds to "irritation". As a result, the actions are not uniform, and individuality can be expressed.

Returning to FIG. 3, the encounter control unit 114 determines whether or not the own device has encountered another robot 200. Here, another robot 200 is a robot 200 that is the same type of device as the own device but is another individual. In principle, another robot 200 has the same configuration and function as the own device, and operates similarly to the own device.

Figure 10:
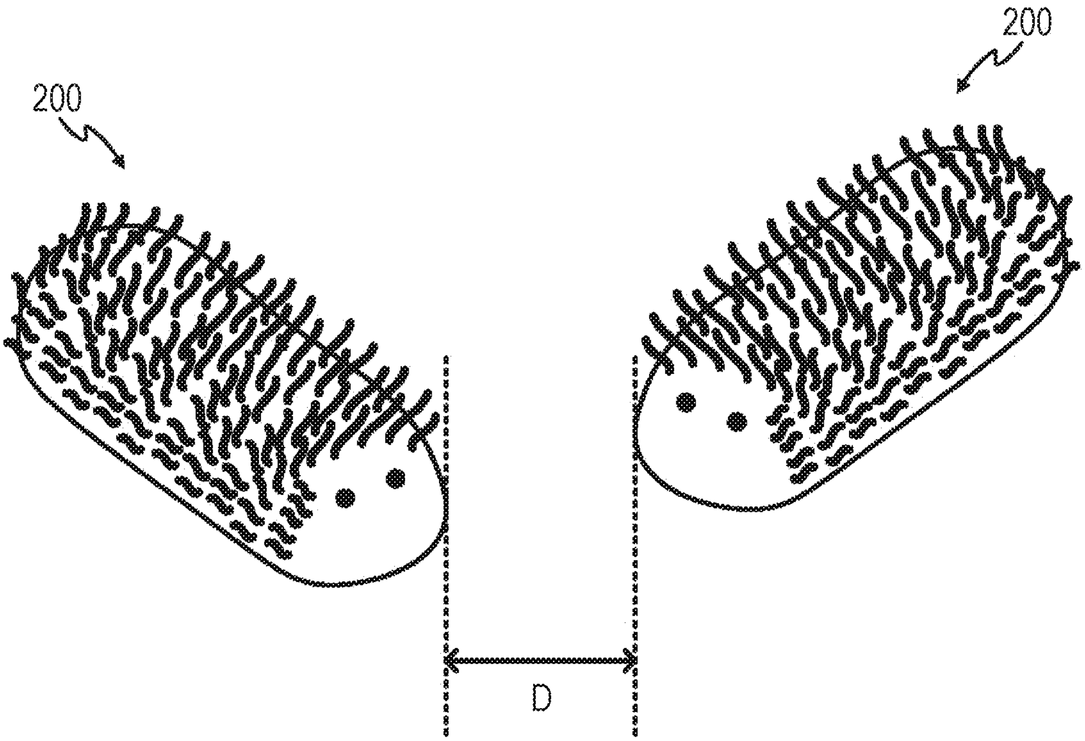
FIG. 10 is a diagram illustrating a state in which the robot according to the first embodiment encounters another robot.

To encounter means that the robots 200 approach within a mutually-recognizable range, and specifically, as illustrated in FIG. 10, corresponds to entering an approaching state in which the robots 200 approach each other within a predetermined distance D. The robots 200 encountering each other may be referred to as "contact". In addition, another robot 200 that has approached the own device within the predetermined distance D and is in an approaching state may be referred to as "approaching device". The encounter control unit 114 executes control in a case where the own device encounters another robot 200 as described above, that is, in a case where the own device is in an approaching state.

The encounter control unit 114 searches the periphery of the own device, and determines whether or not another robot 200 of the same type as the own device is present within a predetermined distance D from the own device, in other words, in the vicinity of the own device. Then, in a case where another robot 200 is present in the vicinity of the own device, the encounter control unit 114 determines that the own device has encountered another robot 200.

Specifically, the encounter control unit 114 uses the search function of BLE to determine whether or not another robot 200 of the same type as the own device is present in the vicinity of the own device. For example, in a case where another robot 200 is present in the vicinity of the own device, the encounter control unit 114 can specify that the robot 200 is the same type of robot 200 as the own device by using the device name in the search function of BLE.

Note that, in the present embodiment, a case where BLE is used will be described as an example, but the encounter control unit 114 may determine whether or not another robot 200 is present in the vicinity of the own device by using not only BLE but also communication by Wi-Fi, infrared rays, or the like. The encounter control unit 114 always executes such a search as a basic rule during normal operation of the own device except in a case where there is a special command from the terminal device 50.

As a result of the search, in a case where it is determined that another robot 200 of the same type as the own device is present in the vicinity of the own device, the encounter control unit 114 performs connection using BLE with the robot 200 as a counterpart. In the connection using BLE, synchronization control by notifying the synchronization timing from the robot 200 as a master to the robot 200 as a slave, interlocking control by instructing the action to be executed, and the like can be performed by the master-slave relationship (central/peripheral relationship).

When the connection by BLE is established, the encounter control unit 114 acquires the counterpart information that is information indicating the ID and the personality parameter of the counterpart robot 200, and transmits the own-device information that is information indicating the ID and the personality parameter of the own device to the counterpart robot 200. The encounter control unit 114 updates the encounter information 125 stored in the storage unit 120 with the counterpart information acquired from the counterpart robot 200.

As illustrated in FIG. 11, the encounter information 125 defines an ID, a date and time of the latest encounter, a cumulative number of times of encounters, a personality parameter, friend registration, intimacy, and a user operation history in association with each other for each of the counterpart robots 200. In the encounter information 125, the date and time of the latest encounter is the date and time of the last encounter with the counterpart robot 200. The cumulative number of times of encounters is the cumulative number of times of past encounters with the counterpart robot 200. The personality parameter is a personality parameter of the counterpart robot 200. The friend registration is registration performed in a case where the intimacy exceeds a threshold. The intimacy is the degree of intimacy between the counterpart robot 200 and the own device. The user operation history is a history of user operations performed while the own device encounters the robot 200 with each ID.

Upon acquiring the encounter information from the counterpart robot 200, the encounter control unit 114 collates the ID indicated in the acquired counterpart information with each ID included in the encounter information 125. Then, the encounter control unit 114 updates information associated with the corresponding ID in the encounter information 125. More specifically, the encounter control unit 114 adds 1 to the cumulative number of times of encounters associated with the corresponding ID in the encounter information 125. Furthermore, the encounter control unit 114 updates the personality parameter associated with the corresponding ID in the encounter information 125 to the personality parameter of the counterpart robot 200 indicated in the acquired counterpart information.

Next, the encounter control unit 114 estimates a distance between the own device and the counterpart robot 200. For example, the encounter control unit 114 refers to the radio field intensity of the BLE signal received from the counterpart robot 200, and estimates that the distance between the own device and the counterpart robot 200 is shorter as the radio field intensity is higher.

In a case where the encounter control unit 114 determines that the own device has encountered another robot 200, the action control unit 113 causes the own device to execute an action corresponding to the encounter with the robot 200. Specifically, in a case where the own device encounters another robot 200, the action control unit 113 causes the own device to execute an action corresponding to the number of times of encounter with the robot 200. In other words, in a case where the own device approaches another robot 200, the action control unit 113 causes the own device to execute an action corresponding to the number of times of approach, which are the number of times the own device has entered the approaching state.

More specifically, in a case where the own device encounters another robot 200, the action control unit 113 first refers to the distance estimated by the encounter control unit 114.

(1) In a case where the estimated distance is short, the action control unit 113 causes the own device to execute an action that produces a greeting to the counterpart robot 200. The case where the estimated distance is short corresponds to, for example, a case where the estimated distance is less than the first distance.

(2) On the other hand, in a case where the estimated distance is slightly short, the action control unit 113 causes the own device to execute an action for searching for the counterpart robot 200. The case where the estimated distance is slightly short corresponds to, for example, a case where the estimated distance is equal to or more than the first distance and less than the second distance. The first distance and the second distance are distances less than a predetermined distance D preset as a threshold. As described above, in a case where the own device encounters another robot 200, the action control unit 113 causes the own device to execute an action corresponding to the distance between the own device and the counterpart robot 200.

In addition, in a case where (1) the estimated distance is short, the action control unit 113 refers to the cumulative number of times of encounters with the robot 200 that has encountered recorded in the encounter information 125. Then, the action control unit 113 changes, as actions corresponding to the cumulative number of times of encounters, actions produced for the counterpart robot 200 as in (1A) to (1C) below.

(1A) More specifically, in a case where the cumulative number of times of encounters is the first time (that is, the first meeting), the action control unit 113 causes the own device to execute an action of producing a warning greeting to the counterpart robot 200.

(1B) On the other hand, when the cumulative number of times of encounters is the second and subsequent times (more precisely, the case that (1C) below is not satisfied), the action control unit 113 causes the own device to execute an action that produces ordinary greetings to the counterpart robot 200.

(1C) In addition, in a case where the own device frequently encounters the counterpart robot 200, the own device is caused to execute an action that produces a greeting of playing with the counterpart robot 200. Here, the case where the own device frequently encounters the counterpart robot 200 corresponds to, for example, a case where the number of times of encounter is 10 times or more and within 3 days from the previous encounter.

In a case where the own device encounters another robot 200 and the estimated distance is short, the action control unit 113 causes the own device to execute an action that has performed such a greeting as the first action during the encounter. In addition, the action control unit 113 causes the own device to execute an action produced for convenience in addition to the action for producing the greetings as described above as the action corresponding to the cumulative number of times of encounters.

For example, the action control unit 113 causes the own device to execute the same motion as the counterpart robot 200 or a motion interlocked with the counterpart robot 200 as an action corresponding to the cumulative number of times of encounters. Alternatively, in a case where the intimacy between the own device and the counterpart robot 200 is equal to or greater than a predetermined value, the action control unit 113 can cause the own device to execute an action or the like that produces an appearance of dancing with the counterpart robot 200. The action control unit 113 causes the own device to execute such an action corresponding to the cumulative number of times of encounters periodically or at random timing while the counterpart robot 200 is present in the vicinity.

In the encounter information 125, the intimacy is the degree of intimacy between the own device and another robot 200. The encounter control unit 114 sets the intimacy on the basis of the number of encounters. In principle, the intimacy with a certain robot 200 is expressed by the number of times of encounter with the robot 200. That is, when the number of encounters increases by one, the intimacy corresponding thereto also increases by one.

In a case of encountering another robot 200, the encounter control unit 114 updates the intimacy with the robot 200 on the basis of the elapsed time from the date and time of the last encounter with the robot 200. More specifically, in a case where the encounter control unit 114 encounters another robot 200, the encounter control unit 114 refers to the date and time of the latest encounter with the robot 200 recorded in the encounter information 125. Then, the encounter control unit 114 reduces the intimacy in a case where an elapsed time from the date and time of the latest encounter has passed a certain period. For example, in a case where 3 months or more have passed since the previous encounter, the encounter control unit 114 reduces the intimacy to half.

In addition, in a case where the own device enters the approaching state with another robot 200 and an external stimulus to the own device is detected by the sensor unit 210, the encounter control unit 114 corrects the intimacy on the basis of the external stimulus. Here, the external stimulus is, as an example, a user operation on the own device. The encounter control unit 114 corrects the intimacy on the basis of a user operation on the own device when the own device encounters another robot 200. Here, the time when the own device encounters another robot 200 is a period from when the counterpart robot 200 approaches the vicinity of the own device (for example, within the predetermined distance D) until the counterpart robot 200 is no longer present in the vicinity.

More specifically, the encounter control unit 114 determines whether or not the sensor unit 210 has detected an operation that gives joy to the robot 200 or an operation disliked by the robot 200 when the own device encounters another robot 200. Here, the operation that makes the robot 200 feel joy is an operation such as being stroked, complimented, or hugged. Furthermore, the operation disliked by the robot 200 is an operation such as being hit, being yelled at, or being turned upside down.

The encounter control unit 114 detects the strength of the contact of the user with the robot 200 using the touch sensor 211, and determines whether the operation corresponds to "being stroked" or "being hit", that is, whether the user operation corresponds to the operation that gives joy or the operation that is disliked on the basis of the strength of the contact. Furthermore, the encounter control unit 114 detects the user's voice using the microphone 213, performs voice recognition on the detected voice, and determines whether the user has been "complimented" or "yelled at". Furthermore, the encounter control unit 114 determines whether "being hugged" or "being turned upside down" on the basis of the detection value of the acceleration sensor 212 or the gyro sensor 215.

The encounter control unit 114 corrects the intimacy every time the number of times the operation that the robot 200 feels joy or dislikes has been detected exceeds a preset threshold (for example, 5 times). Specifically, the encounter control unit 114 increases the intimacy by +0.5 every time the number of times of detection of an operation that gives joy to the robot 200 exceeds a threshold. On the other hand, the encounter control unit 114 decreases the intimacy by −0.5 every time the number of times of detection of an operation disliked by the robot 200 exceeds the threshold. The encounter control unit 114 executes such correction of the intimacy based on the content of the user operation from when the counterpart robot 200 approaches the vicinity of the own device to when the counterpart robot 200 moves away therefrom.

In a case where the intimacy exceeds a predetermined threshold due to such update of the intimacy, the encounter control unit 114 reflects the personality of the counterpart robot 200 on the individuality of the own device. Here, the individuality of the robot 200 is specifically a personality parameter representing a pseudo personality of the robot 200. Note that the threshold may be set to the same value as the initial position of the degree of intimacy, and the individuality of the counterpart robot 200 that has encountered (is in the approaching state) may be reflected in the individuality of the own device regardless of the number of encounters.

More specifically, in a case where the intimacy exceeds a predetermined threshold, the encounter control unit 114 performs friend registration of the counterpart robot 200. Specifically, the encounter control unit 114 records "o" indicating that the registration has been completed in the friend registration column of the counterpart robot 200 in the encounter information 125. Then, the encounter control unit 114 updates the personality parameters of the own device on the basis of the personality parameters of the counterpart robot 200 with whom the friend registration has been performed. By reflecting any or all of the personality parameters of the counterpart robot 200 in the personality parameters of the own device, it is possible to reflect the personality parameters in the subsequent growth, action, and the like of the own device.

Here, as illustrated in FIG. 6, the personality parameter of each robot 200 expresses each of the four types of personality values in 11 stages from 0 to 10. In a case where the individuality of the own device is not affected by the personality of another robot 200, the state parameter acquisition unit 112 updates each of the personality values of the own device within a restricted range from 0 to 10 determined in advance as described above. In other words, in a case where the personality parameter of the own device is updated not on the basis of the personality parameter of another robot 200, the state parameter acquisition unit 112 updates the personality parameter of the own device to a parameter within a restricted range determined in advance.

On the other hand, in a case where the encounter control unit 114 updates the personality parameter of the own device on the basis of the personality parameter of another robot 200, the encounter control unit 114 updates the personality parameter of the own device to a parameter outside the restricted range. In other words, the encounter control unit 114 can update the personality parameter of the own device to a value that cannot be updated in a case of not being based on the personality parameter of another robot 200. Five examples will be given below.

As a first example, the encounter control unit 114 may simply add each personality value of the personality parameter of the counterpart robot 200 to each personality value of the personality parameter of the own device. As a result, each personality value of the personality parameter of the own device is expressed in 21 stages from 0 to 20, and thus can be updated to a value exceeding the upper limit value before addition.

As a second example, in a case where there is a personality (specifically, any of happy, shy, active, and wanted) whose personality value is a predetermined value or more in the personality parameters of the counterpart robot 200, the encounter control unit 114 may increase the personality value of the personality in the personality parameters of the own device by an arbitrary stage. As a result, among the values of the personality parameters of the counterpart robot 200, the elements can be affected by strong personality parameters. Furthermore, in this case, the upper limit of each personality value of the personality parameter of the own device may be set to an arbitrary value exceeding the value updated by the state parameter acquisition unit 112.

As a third example, in a case where a personality (specifically, any of happy, shy, active, and wanted) whose personality value is a predetermined value or more among the personality parameters of the counterpart robot 200 matches with a personality whose personality value is a predetermined value or more among the personality parameters of the own device, the encounter control unit 114 may increase the personality value of the personality in the personality parameters of the own device by an arbitrary stage.

As a fourth example, the encounter control unit 114 may reflect the personality parameter of the counterpart robot 200 in a coefficient that controls the ease of growth of each personality value of the personality parameter of the own device. The coefficient for controlling the ease of growth of each personality value is, for example, the above-described personality correction value or the like. For example, the personality correction value corresponding to the personality of the personality parameter having a value equal to or greater than a predetermined value among the personality parameters of the counterpart robot 200 may be increased by one stage.

As a fifth example, the encounter control unit 114 may add a new type of personality value (for example, a personality value "sociable") different from the four types of personality values of the personality parameters of the own device. Furthermore, for example, as the personality value of "sociable" is higher, the expansion amount of the emotion map per day may be larger, or the personality value of "sociable" may be converted to an arbitrary magnification and multiplied by an arbitrary personality correction value. Since it can be said that the new type of personality value is limited to 0 before the addition, it can be said that the addition of the new type of personality value and the setting of an appropriate value correspond to updating the personality parameter of the own device to a parameter outside the restricted range.

As described above, by reflecting the personality parameters of the robot 200 that has encountered in the personality parameters of the own device, it is possible to achieve growth that cannot be achieved by raising the robot 200 alone.

In a case where the encounter control unit 114 encounters the robot 200 whose friend registration has already been made in the encounter information 125 again, the encounter control unit 114 does not reflect the personality parameters. This prevents the reflection of the personality parameters with the same robot 200 as a counterpart from being performed many times. Note that, as long as it can be determined that the reflection of the personality parameters has been performed in the past, not only the friend registration but also any kind of information may be registered in the encounter information 125.

The encounter control unit 114 reflects the information of the friend registration in the encounter information 125 in deciding the action described above. For example, even if the encounter with the robot 200 registered as a friend once in the encounter information 125 has been a while, the encounter control unit 114 does not lower the intimacy of the robot 200.

When the encounter control unit 114 detects that the counterpart robot 200 is no longer present in the vicinity, it determines that the encounter with the counterpart robot 200 has ended. In this case, the encounter control unit 114 updates the previous encounter date and time in the encounter information 125 to the current date and time, and ends the encounter control.

Note that, in a case where two or more robots 200 are simultaneously present in the vicinity of the own device, the encounter control unit 114 may be BLE connected to each of the two or more robots 200 and execute the above-described processing using each of the two or more robots 200 as the counterpart robot 200. In this case, the action control unit 113 can cause the own device to execute an action alternately interlocked with each of the two or more robots 200, or cause the own device to execute an action simultaneously interlocked with all of the two or more robots 200. However, it is also possible to set a limit so as not to be simultaneously connected to the robots 200 of which the number is equal to or larger than the upper limit number (for example, 3 robots or the like).

Figure 12:
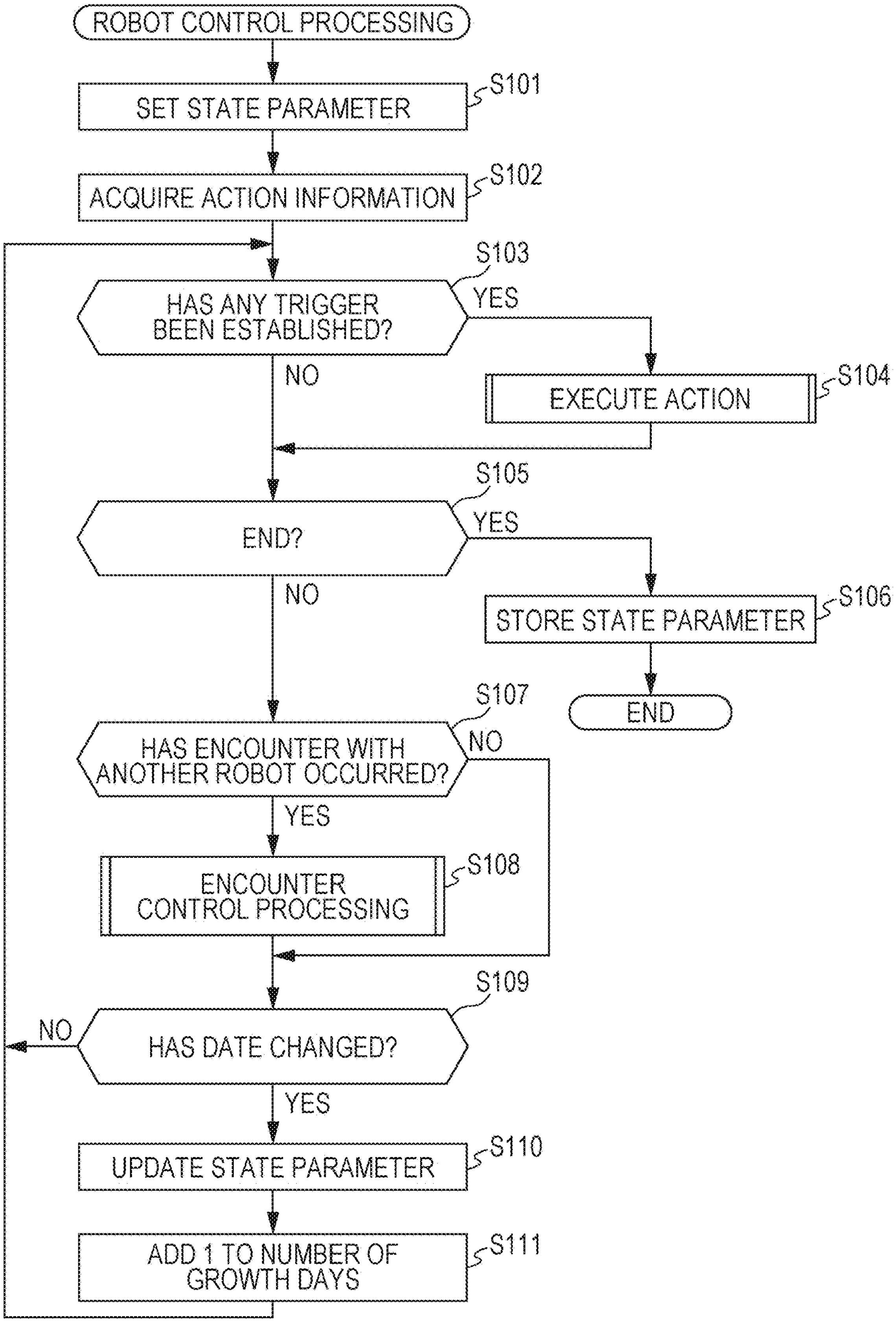
FIG. 12 is a flowchart illustrating a flow of robot control processing according to the first embodiment.

Next, a flow of robot control processing will be described with reference to FIG. 12. The robot control processing illustrated in FIG. 12 is executed by the control unit 110 of the control device 100 when the user turns on the power of the robot 200. The robot control processing is an example of a method for controlling the electronic device.

When the robot control processing is started, the control unit 110 sets the state parameter 122 (step S101). At the time of the first activation of the robot 200 (at the time of the first activation by the user after shipment from the factory), the control unit 110 sets parameters of the emotion parameter, the personality parameter, and the number of growth days to initial values (for example, 0). On the other hand, at the time of the second or subsequent activation, the control unit 110 reads the value of each parameter stored in step S106 to be described later of the previous robot control processing and sets the value as the state parameter 122. However, all the emotion parameters may be initialized to 0 each time the power is turned on.

When the state parameter 122 is set, the control unit 110 communicates with the terminal device 50 and acquires the action information 121 created on the basis of the user operation in the terminal device 50 (step S102). In a case where the action information 121 is already stored in the storage unit 120, step S102 may be skipped.

When the action information 121 is acquired, the control unit 110 determines whether or not any trigger among a plurality of action triggers defined in the action information 121 has been established (step S103).

In a case where any of the triggers has been established (step S103; YES), the control unit 110 causes the robot 200 to execute an action corresponding to the established trigger (step S104). Details of the action control processing in step S104 will be described with reference to the flowchart in FIG. 13. Step S104 is an example of the control step.

Figure 13:
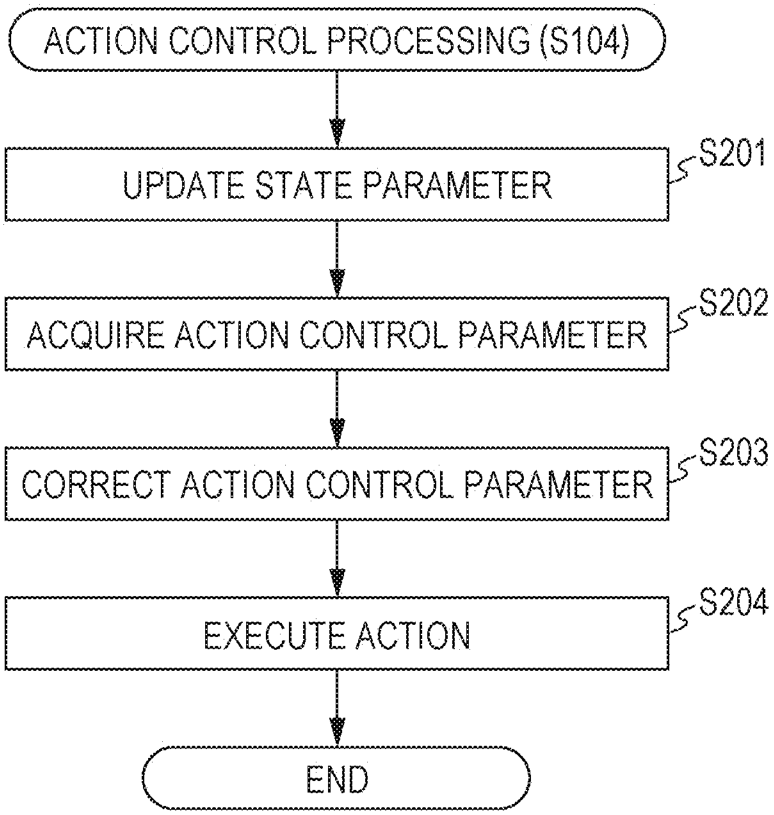
FIG. 13 is a flowchart illustrating a flow of action control processing according to the first embodiment.

When starting the action control processing illustrated in FIG. 13, the control unit 110 updates the state parameter 122 (step S201). More specifically, in a case where the trigger established in step S103 is based on an external stimulus, the control unit 110 derives an emotion change amount corresponding to the external stimulus. Then, the control unit 110 adds or subtracts the derived emotion change amount to or from the current emotion parameter to update the emotion parameter. In addition, during the child period, the control unit 110 calculates each personality value of the personality parameter from the emotion change amount updated in step S108 according to (Equation 1) described above. On the other hand, during the adult period, the control unit 110 calculates each personality value of the personality parameter from the emotion change amount and the personality correction value updated in step S108 according to (Equation 2) described above.

When the state parameter 122 is updated, the control unit 110 refers to the action information 121 to acquire the action control parameter of the action corresponding to the set trigger (step S202). More specifically, the control unit 110 acquires, from the action information 121, a combination of an operation or a cry which is an element constituting an action corresponding to the established trigger, an execution start timing of each element, and an operation parameter or a cry parameter.

When acquiring the action control parameter, the control unit 110 corrects the action control parameter on the basis of the correction coefficient set in the coefficient table 124 (step S203). Specifically, in the coefficient table 124, the control unit 110 calculates the sum of the correction coefficients corresponding to the state parameter 122 updated in step S201 among the correction coefficients determined for (1) the emotion parameter, (2) the personality parameter, (3) the remaining battery level, (4) the current location, and (5) the current time. Then, the control unit 110 corrects the operation parameter, the cry parameter, and the execution start timing with the sum of the calculated correction coefficients.

After correcting the action control parameter, the control unit 110 executes an action corresponding to the established trigger (step S204). More specifically, the control unit 110 drives the drive unit 220 or outputs a voice from the speaker 231 in accordance with the action control parameter corrected in step S203. As described above, the action control processing illustrated in FIG. 13 ends.

Referring back to FIG. 12, in a case where any trigger among the triggers of the plurality of actions has not been established in step S103 (step S103; NO), the control unit 110 skips step S104.

Next, the control unit 110 determines whether or not to end the processing (step S105). For example, when the operation unit 240 receives an instruction to turn off the power of the robot 200 from the user, the processing is ended. In a case of ending the processing (step S105; YES), the control unit 110 stores the current state parameter 122 in the nonvolatile memory of the storage unit 120 (step S106), and ends the robot control processing shown in FIG. 12.

In a case where the processing is not ended (step S105; NO), the control unit 110 determines whether or not the encounter with another robot 200 has occurred (step S107). More specifically, the control unit 110 uses the search function of BLE to determine whether another robot 200 is present in the vicinity of the own device.

In a case where the encounter with another robot 200 has occurred (step S107; YES), the control unit 110 executes the encounter control processing (step S108). Details of the encounter control processing in step S108 will be described with reference to FIG. 14.

Figure 14:
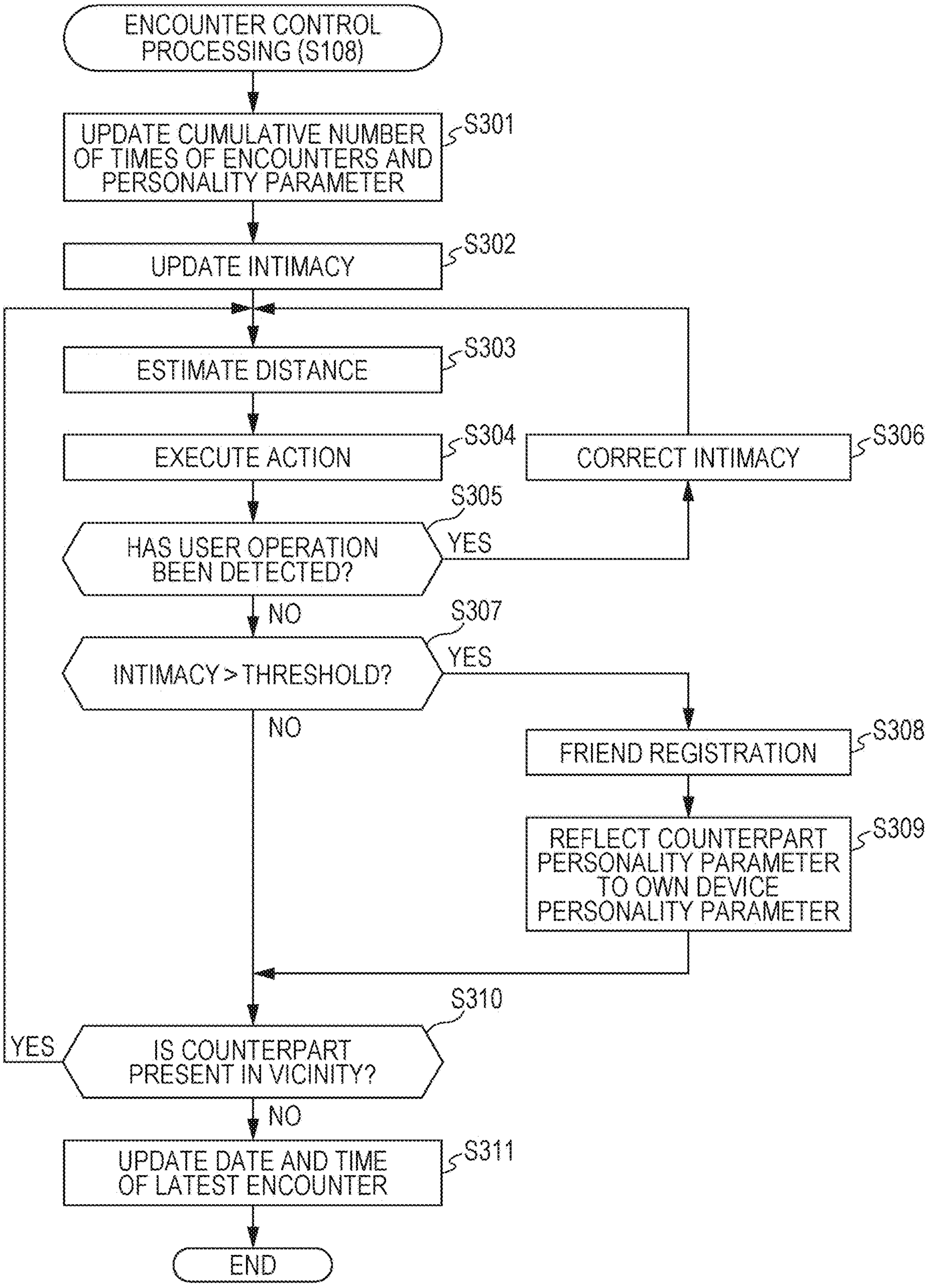
FIG. 14 is a flowchart illustrating a flow of encounter control processing according to the first embodiment.

When the encounter control processing illustrated in FIG. 14 is started, the control unit 110 updates the cumulative number of times of encounters and the personality parameters in the encounter information 125 (step S301). Specifically, the control unit 110 acquires the ID of the robot 200 encountered, adds 1 to the cumulative number of times of encounters associated with the ID acquired from the encounter information 125, and updates the personality parameter associated with the ID acquired in the encounter information 125 to the personality parameter of the robot 200 encountered.

Next, the control unit 110 updates the intimacy in the encounter information 125 on the basis of the elapsed time from the date and time of the latest encounter (step S302). More specifically, in a case where an elapsed time from the date and time of the latest encounter has passed a certain period, the control unit 110 reduces the intimacy.

When the encounter information 125 is updated, the control unit 110 estimates the distance between the own device and the counterpart robot 200 on the basis of the radio field intensity of the BLE signal received from the counterpart robot 200 (step S303).

When the distance is estimated, the control unit 110 causes the own device to execute an action corresponding to the estimated distance and the cumulative number of times of encounters with the counterpart robot 200 (step S304). For example, in a case where the estimated distance is less than the first distance, the control unit 110 causes the own device to execute an action that produces a greeting. At that time, the control unit 110 causes the own device to execute an action that produces a warning greeting, an ordinary greeting, or a playing greeting in accordance with the cumulative number of times of encounters. On the other hand, in a case where the estimated distance is the first distance or more and less than the second distance, the control unit 110 causes the own device to execute an action of searching for the counterpart robot 200.

Next, the control unit 110 determines whether or not a user operation has been detected by the sensor unit 210 (step S305). In a case where a user operation is detected (step S305; YES), the control unit 110 corrects the intimacy with the robot 200 encountered (step S306). More specifically, the control unit 110 increases the intimacy in a case where an operation that gives the own device joy has been detected, and decreases the intimacy when detecting an operation disliked by the own device. After correcting the intimacy, the control unit 110 returns the processing to step S303.

In a case where the user operation has not been detected (step S305; NO), the control unit 110 determines whether or not the intimacy with the encountered robot 200 exceeds the threshold (step S307). In a case where the intimacy exceeds the threshold (step S307; YES), the control unit 110 performs friend registration of the counterpart robot 200 (step S308).

After performing the friend registration, the control unit 110 reflects the personality parameters of the counterpart robot 200 on the personality parameters of the own device (step S309). For example, by adding each personality value of the personality parameter of the counterpart robot 200 to each personality value of the personality parameter of the own device, the control unit 110 updates the personality parameter of the own device on the basis of the personality parameter of the counterpart robot 200.

On the other hand, in a case where the intimacy does not exceed the threshold (step S307; NO), the control unit 110 skips steps S308 and S309.

Next, the control unit 110 determines again whether or not the counterpart robot 200 is present in the vicinity (step S310). In other words, the control unit 110 determines whether or not the encounter with the counterpart robot 200 continues.

The control unit 110 returns the processing to step S303. Then, the control unit 110 repeats the processing of steps S303 to S310 while the encounter with the counterpart robot 200 continues.

On the other hand, in a case where the counterpart robot 200 is not present in the vicinity (step S310; NO), the control unit 110 updates the date and time of the latest encounter in the encounter information 125 to the current date and time (step S311). Thus, the encounter control processing illustrated in FIG. 14 ends.

Referring back to FIG. 12, in a case where the encounter with another robot 200 has not occurred in step 107 (step S107; NO), the control unit 110 skips the encounter control processing in step S108.

Next, the control unit 110 determines whether or not the date has changed by the clock function (step S109). In a case where the date has not changed (step S109; NO), the process returns to step S103.

In a case where the date has changed (step S109; YES), the control unit 110 updates the state parameter 122 (step S110). More specifically, in a case of the child period (for example, 50 days since birth), the control unit 110 changes the values of the emotion change amounts DXP, DXM, DYP, and DYM in accordance with whether or not the emotion parameter reaches the maximum value or the minimum value of the emotion map 300. Furthermore, in a case of the child period, the control unit 110 expands the emotion map 300 by a predetermined increase amount (for example, 2) for both the maximum value and the minimum value. On the other hand, in a case of the adult period, the control unit 110 adjusts the personality correction value.

When updating the state parameter 122, the control unit 110 adds 1 to the number of growth days (step S111), and returns to step S103. Then, as long as the robot 200 operates normally, the control unit 110 repeats the processing from step S103 to step S111.

As described above, the robot 200 according to the first embodiment executes the action corresponding to the personality parameter of the own device, and updates the personality parameter of the own device on the basis of the personality parameter of the robot 200 that has encountered the own device. As a result, it is possible to be affected by another robot 200 or affect another robot 200, and thus, it is possible to improve animacy. Furthermore, since the variation in the growth of the robot 200 is widened, it is possible to improve the utility value over a long period of time, and it is expected to improve the healing effect, create a feeling of attachment, promote communication between users, and the like.

Furthermore, in a case where the robot 200 according to the first embodiment encounters another robot 200, the robot 200 executes an action corresponding to the number of times of encounter, which is the number of times of encounter with another robot 200. As described above, since the robot 200 according to the first embodiment executes an action according to the number of times of encounter with another robot 200, it is possible to further improve animacy in a case where another robot 200 is present in the vicinity of the own device.

Second Embodiment

Next, a second embodiment will be described. Configurations and functions similar to those of the first embodiment will not be described as appropriate.

In the first embodiment described above, the robot 200 has the function of the encounter control unit 114, and the robots 200 directly estimate the distance with the counterpart to each other to determine the encounter. On the other hand, in the second embodiment, the terminal device 50 has the function of the encounter control unit 114. Then, the encounter control unit 114 determines that the robot 200 of the own device has encountered another robot 200 in a case where the terminal device 50 corresponding to another robot 200 is in an approaching state in which the terminal device 50 corresponding to the robot 200 of the own device is in a state of approaching within the predetermined distance D from the terminal device 50 corresponding to the robot 200 of the own device.

Figure 15:
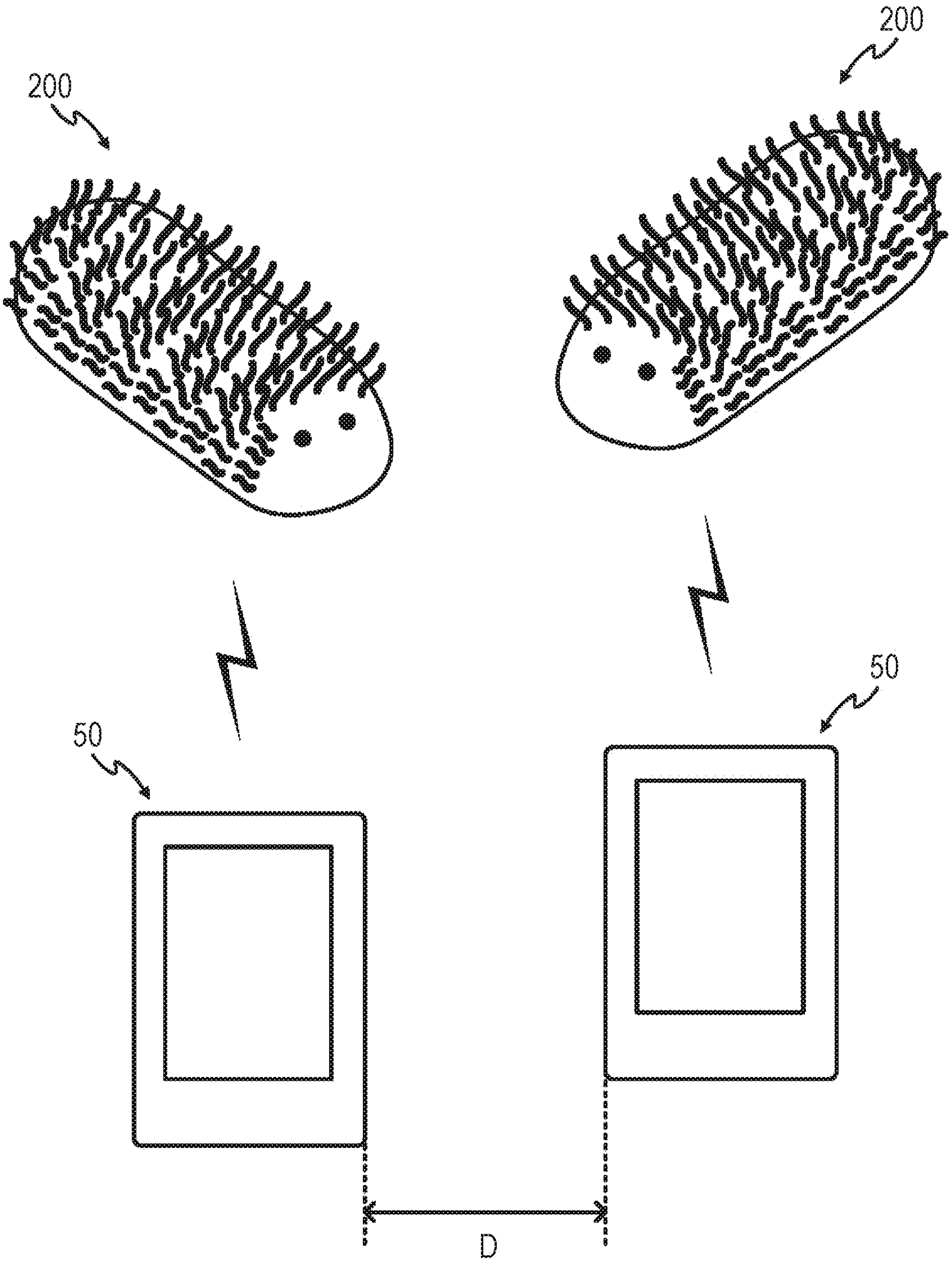
FIG. 15 is a diagram illustrating a state in which a robot according to a second embodiment encounters another robot.

FIG. 15 illustrates a state in which the robots 200 according to the second embodiment encounter each other. In the second embodiment, in a case where the first terminal device 50 corresponding to the first robot 200 and the second terminal device 50 corresponding to the second robot 200 approach within the predetermined distance D, the encounter control unit 114 determines that the first robot 200 and the second robot 200 have encountered, that is, entered an approaching state.

In other words, in the first embodiment, the number of times of encounter (number of times of approach) is the number of times another robot 200 has approached within the predetermined distance D from the own device, but in the second embodiment, the number of times of encounter (the number of times of approach) is the number of times the terminal device 50 corresponding to another robot 200 has approached within the predetermined distance D from the terminal device 50 corresponding to the own device.

Here, the first terminal device 50 and the second terminal device 50 are devices for controlling the first robot 200 and the second robot 200, respectively, and have the same configuration and function in principle. In each of the first terminal device 50 and the second terminal device 50, the encounter control unit 114 executes the encounter control processing illustrated in FIG. 14 in the first embodiment, and updates and manages the encounter information 125 of the corresponding robot 200. The encounter control unit 114 communicates with the robot 200 of the own device via the communication unit 550, and transmits the encounter information 125 updated by the encounter control processing to the corresponding robot 200. As a result, the encounter control unit 114 causes the corresponding robot 200 to execute an action corresponding to the encounter.

As described above, in the second embodiment, even if the robot 200 does not have the function of the encounter control unit 114, particularly ion of searching the periphery of the own device and determining the presence of another robot 200, it is possible to execute the encounter control with another robot 200, and to obtain the same effect as the first embodiment.

(Modifications)

Although the embodiments of the present disclosure have been described above, the above embodiments are examples, and the applicable range of the present disclosure is not limited thereto. That is, the embodiments of the present disclosure can be applied in various ways, and all the embodiments are included in the scope of the present disclosure.

For example, in the above embodiments, in a case where the degree of intimacy exceeds a predetermined threshold due to the update of the degree of intimacy, the encounter control unit 114 reflects the personality parameters of the robot 200 of the encountered counterpart robot 200 on the personality parameter of the own device. However, the encounter control unit 114 may update the personality parameter of the own device on the basis of the length of the time of encounter (the time in the approaching state). Here, the time of encounter means a time from when the counterpart robot 200 approaches the vicinity of the own device (within the predetermined distance D) until the counterpart robot 200 is no longer present in the vicinity. Specifically, the encounter control unit 114 may add more sociable parameters of the own device as the time of encounter is longer, may add a value obtained by multiplying the value of the personality parameter of the encountered counterpart robot 200 by a large scale magnification to the personality parameters of the own device as the time of encounter is longer, may increase the personality value of the personality among the personality parameters of the own device in a case where there is a personality having a personality value of a predetermined value or more in the personality parameters of the encountered counterpart robot 200 as the time of encounter is longer, or may strongly reflect the personality parameter of the counterpart robot 200 to a coefficient that controls the ease of growth of each personality value of the personality parameter of the own device as the time of encounter is longer.

In the above embodiments, the control device 100 is built in the robot 200, but the control device 100 may be a separate device (for example, a server) without being built in the robot 200. In a case where the control device 100 is present outside the robot 200, the control device 100 communicates with the robot 200 via the communication unit 130 to transmit and receive data to and from each other, and controls the robot 200 as described in the above embodiments.

In the above embodiments, the exterior 201 is formed in a cylindrical shape from the head portion 204 to the body portion 206, and the robot 200 has a belly-crawl shape. However, the robot 200 is not limited to the robot imitating a living thing having a belly-craw shape. For example, the robot 200 may have a shape having limbs and may simulate a four-legged walking or two-legged walking living thing.

Furthermore, the electronic device is not limited to the robot 200 simulating a living thing. For example, the electronic device may be a wristwatch or the like as long as the electronic device can express individuality by executing various actions. Even an electronic device other than the robot 200 can be described in the same manner as in the above embodiments by having the same configuration and function as those of the robot 200 described above.

In the above embodiments, in the control unit 110, the CPU executes the program stored in the ROM, thereby functioning as each unit such as the action control unit 113 and the like. However, in the present disclosure, the control unit 110, 510 may include dedicated hardware such as an application specific integrated circuit (ASIC), a field-programmable gate array (FPGA), or various control circuits instead of the CPU, and the dedicated hardware may function as each unit such as the action control unit 113. In this case, the functions of the respective units may be realized by individual hardware, or the functions of the respective units may be collectively realized by a single hardware. In addition, some of the functions of the respective units may be implemented by dedicated hardware, and other functions may be implemented by software or firmware.

Note that, not only can it be provided as the robot 200 or the terminal device 50 provided with a configuration for realizing the function according to the present disclosure in advance, but also an existing information processing device or the like can be caused to function as the robot 200 or the terminal device 50 according to the present disclosure by application of a program. That is, it is possible to cause the robot 200 or the terminal device 50 according to the present disclosure to function as the robot 200 or the terminal device 50 by applying a program for realizing each functional configuration of the robot 200 or the terminal device 50 exemplified in the above embodiments such that a CPU or the like that controls an existing information processing device or the like can execute the program.

Furthermore, a method of applying such a program is arbitrary. The program can be stored and applied in a computer-readable recording medium such as a flexible disk, a compact disc (CD)-ROM, a digital versatile disc (DVD)-ROM, or a memory card. In addition, the program may be superimposed on a carrier wave and applied via a communication medium such as the Internet. For example, the program may be posted and distributed on a bulletin board system (BBS) on a communication network. The above processing may be executed by starting the program and executing the program in the same manner as other application programs under the control of an operating system (OS).

Although the preferred embodiments and the like of the present disclosure have been described above, the present disclosure is not limited to the above-described embodiments and the like, and various modifications and substitutions can be made to the above-described embodiments and the like without departing from the scope described in the claims.

What is claimed is:

1. An electronic device comprising:
a processor configured to:
update, in a case of an approaching state, a value of a personality parameter representing a pseudo personality of the electronic device based on a value of a personality parameter representing a pseudo personality of another device of a same type as the electronic device, the approaching state being a state in which the electronic device approaches the another device within a predetermined distance or a state in which a terminal device corresponding to the another device approaches a terminal device corresponding to the electronic device within the predetermined distance;
update, in a case where the value of the personality parameter of the electronic device is updated independently of the value of the personality parameter of the another device, the value of the personality parameter of the electronic device to a parameter value within a predetermined restricted value range; and
update, in a case where the value of the personality parameter of the electronic device is updated based on the value of the personality parameter of the another device, the value of the personality parameter of the electronic device to a parameter value outside the predetermined restricted value range.

2. The electronic device according to claim 1, wherein the processor is further configured to:
cause the electronic device to execute an action corresponding to the value of the personality parameter of the electronic device; and
cause, in the case of the approaching state, the electronic device to execute actions corresponding to a number of times of approach, the number of times of approach being a number of times that the electronic device has entered the approaching state with the another device.

3. The electronic device according to claim 2, wherein the processor is further configured to:
set an intimacy between the electronic device and the another device based on the number of times of approach; and
update, in a case where the intimacy exceeds a threshold, the value of the personality parameter of the electronic device based on the value of the personality parameter of the another device.

4. The electronic device according to claim 3, wherein the processor is configured to correct, in the case of the approaching state and a case where an external stimulus to the electronic device is detected by a predetermined sensor, the intimacy based on the external stimulus.

5. The electronic device according to claim 1, wherein the processor is configured to add, in the case of the approaching state, each personality value of the personality parameter of the another device to each personality value of the personality parameter of the electronic device, to update the value of the personality parameter of the electronic device.

6. The electronic device according to claim 1, wherein the processor is configured to estimate the approaching state based on a radio field intensity of a signal received by the electronic device from the another device.

7. The electronic device according to claim 6, wherein the processor is configured to estimate that the approaching state is closer as the radio field intensity of the signal received by the electronic device from the another device is higher.

8. The electronic device according to claim 1, wherein the processor is configured to update the value of the personality parameter of the electronic device based on a length of time during which the electronic device is in the approaching state.

9. The electronic device according to claim 3, wherein the processor is configured to update the intimacy based on an elapsed time from a latest date and time when the electronic device has been in the approaching state.

10. The electronic device according to claim 9, wherein the processor is configured to update the intimacy in a case where the elapsed time exceeds a predetermined time.

11. The electronic device according to claim 9, wherein the processor is configured to add or subtract, in a case where the electronic device is in the approaching state with the another device and an external stimulus to the electronic device has been detected, the intimacy in accordance with the external stimulus.

12. A method for controlling an electronic device, the method comprising:

updating, in a case of an approaching state, a value of a personality parameter representing a pseudo personality of the electronic device based on a value of a personality parameter representing a pseudo personality of another device of a same type as the electronic device, the approaching state being a state in which the electronic device approaches the another device within a predetermined distance or a state in which a terminal device corresponding to the another device approaches a terminal device corresponding to the electronic device within the predetermined distance;

updating, in a case where the value of the personality parameter of the electronic device is updated independently of the value of the personality parameter of the another device, the value of the personality parameter of the electronic device to a parameter value within a predetermined restricted value range; and updating, in a case where the value of the personality parameter of the electronic device is updated based on the value of the personality parameter of the another device, the value of the personality parameter of the electronic device to a parameter value outside the predetermined restricted value range.

13. A non-transitory computer-readable recording medium storing a program for causing a computer of an electronic device to execute processes comprising:

updating, in a case of an approaching state, a value of a personality parameter representing a pseudo personality of the electronic device based on a value of a personality parameter representing a pseudo personality of another device of a same type as the electronic device, the approaching state being a state in which the electronic device approaches the another device within a predetermined distance or a state in which a terminal device corresponding to the another device approaches a terminal device corresponding to the electronic device within the predetermined distance;

updating, in a case where the value of the personality parameter of the electronic device is updated independently of the value of the personality parameter of the another device, the value of the personality parameter of the electronic device to a parameter value within a predetermined restricted value range; and updating, in a case where the value of the personality parameter of the electronic device is updated based on the value of the personality parameter of the another device, the value of the personality parameter of the electronic device to a parameter value outside the predetermined restricted value range.

* * * * *